United States Patent
Ahmad et al.

(10) Patent No.: US 7,159,103 B2
(45) Date of Patent: Jan. 2, 2007

(54) ZERO-OVERHEAD LOOP OPERATION IN MICROPROCESSOR HAVING INSTRUCTION BUFFER

(75) Inventors: Sagheer Ahmad, Sunnyvale, CA (US); Matthias Knoth, San Jose, CA (US); Roger D. Arnold, Sunnyvale, CA (US)

(73) Assignee: Infineon Technologies AG, Munich (DE)

( * ) Notice: Subject to any disclaimer, the term of this patent is extended or adjusted under 35 U.S.C. 154(b) by 426 days.

(21) Appl. No.: 10/396,063

(22) Filed: Mar. 24, 2003

(65) Prior Publication Data
US 2004/0193858 A1 Sep. 30, 2004

(51) Int. Cl.
*G06F 9/44* (2006.01)

(52) U.S. Cl. ..................... 712/241; 712/239

(58) Field of Classification Search ........... 712/239, 712/241
See application file for complete search history.

(56) References Cited

U.S. PATENT DOCUMENTS

| | | | | |
|---|---|---|---|---|
| 5,734,881 A | * | 3/1998 | White et al. | 712/238 |
| 6,076,159 A | * | 6/2000 | Fleck et al. | 712/241 |
| 6,085,315 A | * | 7/2000 | Fleck et al. | 712/241 |
| 6,477,639 B1 | * | 11/2002 | Krishnan et al. | 712/237 |

OTHER PUBLICATIONS

Intel Architecture Software Devloper's Manual, 1997, Intel Co., vol. 2, p. 278-279.*

* cited by examiner

*Primary Examiner*—Fritz Fleming
*Assistant Examiner*—Vincent Lai
(74) *Attorney, Agent, or Firm*—Dickstein Shapiro LLP

(57) ABSTRACT

A loop instruction, at least one target instruction, and an associated trigger address are cached during loop entry. During each loop iteration, the processor predicts whether the loop will be taken or not-taken in a subsequent iteration. When pre-fetch of the cached loop instruction is subsequently detected (i.e., by comparing the trigger address with the current program counter value), the loop taken/not-taken prediction is used to fetch either loop body instructions (when predicted taken) or fall-through instructions (when predicted not-taken). The cached loop instruction is then executed and the loop taken/not-taken prediction is verified using a dedicated loop execution circuit while a penultimate loop body instruction is executed in the processor execution stage (pipeline). When a previous loop taken prediction is verified, the cached target instruction is executed, and then the fetched loop body instructions are executed. When a loop not-taken prediction is verified, the fetched fall-through instructions are executed.

28 Claims, 13 Drawing Sheets

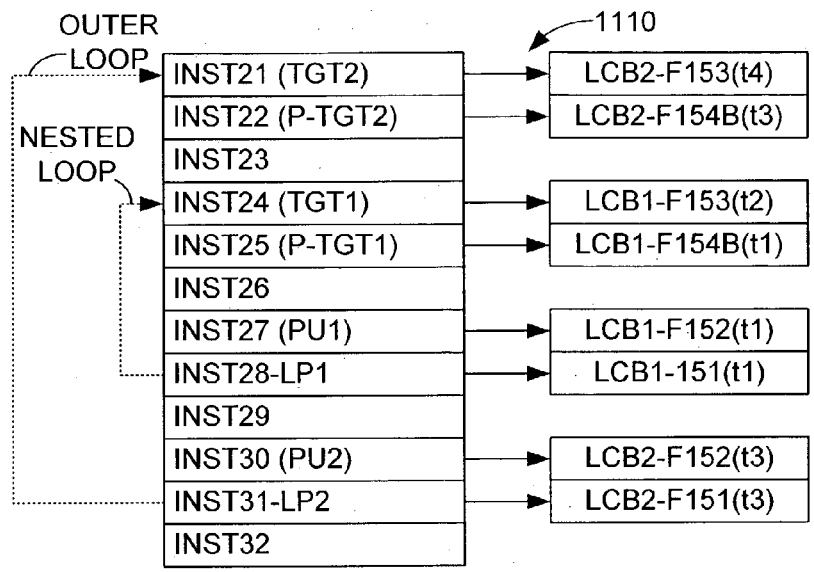
FIG. 11
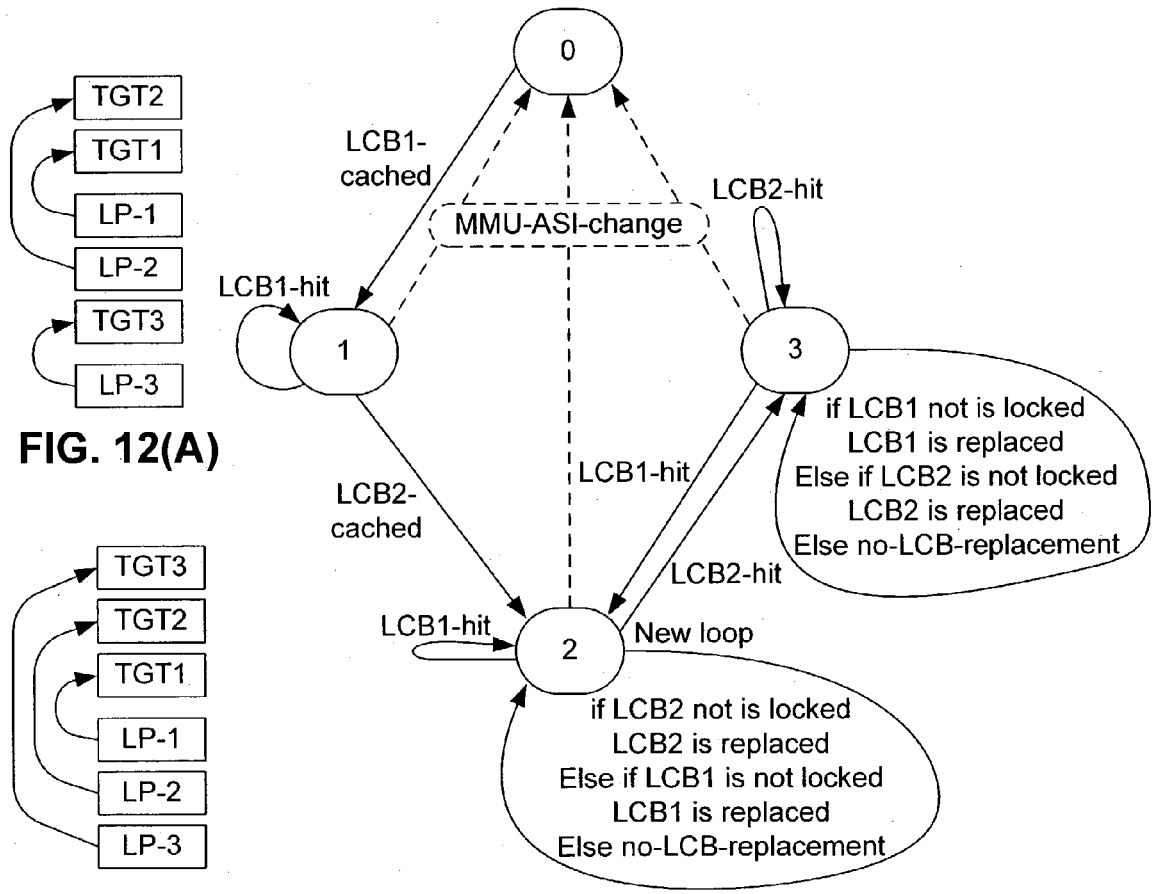
FIG. 12(A)
FIG. 12(B)
FIG. 13

ZERO-OVERHEAD LOOP OPERATION IN MICROPROCESSOR HAVING INSTRUCTION BUFFER

FIELD OF THE INVENTION

The present invention pertains generally to computing systems. More specifically, the present invention relates to a computing system microprocessor that includes an instruction buffer for storing fetched program instructions before issuance to an execution pipeline.

BACKGROUND OF THE INVENTION

FIG. 14 is a simplified diagram showing a conventional microprocessor (processor) 1400 that utilizes an instruction buffer (i.e., decode instruction buffer (DIB) 122, discussed below) for storing fetched program instructions before issuance to an execution pipeline. Processor 1400 is generally consistent with the TriCore™ family of processor devices produced by Infineon Technologies AG of Munich, Germany. Those skilled in the art of processors will recognize that the description of processor 1400 is greatly simplified for explanatory purposes, and that some of the circuit components described separately below may be integrated with other components, or omitted entirely.

Processor 1400 is generally partitioned into a pre-fetch stage 110, a fetch/pre-decode stage 115, a decode stage 120, and an execution stage 130. Pre-fetch stage 110 includes program counter 111 and a memory management unit (MMU) 112 that cooperate to transmit address signals used to read corresponding program instructions from a system (e.g., cache, local, and/or external) memory 101, which then writes these program instructions to fetch/pre-decode stage 115. Fetch/pre-decode stage 115 includes a fetch portion 116 having program memory interface (PROG MEM INTRFC) 117 for receiving the program instructions, and a pre-decode portion 118 including a decode instruction buffer input circuit 119 that partially decodes the instructions, and writes the instructions into decode stage 120 in the manner described below. Decode stage 120 includes DIB 122 and a decode/issue circuit 125. Execution stage 130 includes the processor "pipeline" that executes the decoded program instructions issued from decode stage 120. In the present example, execution stage 130 includes two processor pipelines: a load/store (LS) pipeline 132, and an integer processing (IP) pipeline 136. Each pipeline includes two execution stages (i.e., EX1 and EX2) and a write back stage. Processor 1400 also includes loop counter register 105A, which in the present example stores a loop counter value. Note that loop counter register 105A may be one of several general-purpose registers provided by processor 1400.

DIB 122 can be logically represented as a circular buffer having several registers (e.g., four registers REG1-REG4), an input (write) pointer controlled by DIB input circuit 119, and one or more output pointers controlled by decode/issue circuit 125. The write pointer points to one of registers REG1-REG4, and fetch/pre-decode stage 115 writes one, two, three or four instructions to the pointed-to register each write cycle. For example, in a first write cycle the write point points to REG1 and four 16-bit instructions are written to REG1, then in a next write cycle the write pointer points to REG2 and two 32-bit instructions are written to REG2 . . . then the write pointer points to REG4 and one 32-bit instruction and two 16-bit instructions are written to REG4, then the write point returns to REG1 and new instructions are written into REG1. Note that previously written instructions are issued from each register before new instructions are written to that register. Also, depending on the processor, one or more of these instructions are issued from registers REG1-REG4 to execution stage 130 during each issue cycle, where the decoded instructions are either to LS pipeline 132 or IP pipeline 136, depending on the issued instruction's "type". For example, in a first issue cycle, a first 16-bit or 32-bit IP-type instruction is issued to IP pipeline 136 and a second 16-bit or 32-bit LS-type instruction is issued to LS pipeline 132 from DIB register REG1. Depending on the processor, the order in which the LS-type instructions and IP-type instructions are arranged may determine whether one or two instructions are issued per issue cycle. For example, in a second issue cycle, a third 16-bit or 32-bit LS-type instruction (which follows the previously-issued second LS-type instruction) may be issued to LS pipeline 132 from REG1 (i.e., because the second and third instructions are LS instructions, no IP instruction is issued during the second issue cycle). This issue process continues, first issuing from REG1, then moving to REG2, REG3, and REG4, respectively, and then return to REG1. By storing and issuing several instructions in registers REG1-REG4 in this manner, DIB 122 acts as an instruction buffer that allows fetch/pre-fetch stage 115 to operate at a different speed than execution stage 130, which facilitates high speed processing.

Operation of processor 1400 typically involves processing (executing) a software program, which is a predetermined series of program instructions read from system memory 101 that collectively cause processor 1400 to perform a desired computing task. During development of such software programs, the program instructions are generally arranged in the order in which they are processed (executed), and the thus-arranged program instructions are assigned (stored) in corresponding sequential memory locations in system memory 101 prior to execution by processor 1400.

Program instructions can be generally classified as operations, which are sequentially executed in execution stage 130, and branch (or jump) instructions that cause program control to "jump" from one instruction to an out-of-order instruction. One conditional branch instruction that is often used in software programs is a loop instruction, which allows a program to repeatedly execute an instruction (or series of instructions) a specified number of times, or until a certain condition is met. Almost all programming languages have several different loop instructions designed for different purposes.

FIG. 15 is a simplified diagram depicting a portion 1500 of a software program that utilizes a commonly used type of loop instruction. Each instruction INST0 through INST12 of program portion 1500 is assigned a sequentially arranged address X0000 through X1100, respectively, that represents a corresponding memory location in memory 101 (FIG. 14). For sake of brevity, the operations performed by instructions INST0 through INST12 are only indicated for instructions that are relevant to the following discussion. For example, instruction INST1 sets a loop counter R1 to integer value three (indicated by "[R1==3]"), and loop instruction INST9 is a loop instruction that functions as described below. The functions of the other instructions (i.e., INST0, INST2–INST8, and INST10–INST12) perform operations that are sequential in nature (i.e., these instructions do not produce a non-sequential change in program control).

In the present example, loop instruction INST9 is of a type that functions to decrement a designated loop counter (i.e., loop counter R1 in this example) by one each time loop instruction INST9 is executed, to pass program control to a target instruction (i.e., address X0010, which makes instruction INST2 the target instruction of loop instruction INST9 in this example) while loop counter R1 is greater than zero, and to pass program control to the next sequential (fall-through) instruction following the loop instruction (i.e., instruction INST10 in this example) when loop counter R1 equals zero. As utilizes herein, the term "taken" refers to the case where, when the loop instruction is executed, program control jumps to the target instruction, and the term "not-taken" refers to the case where program control passes to the loop's fall-through instructions. Accordingly, while loop counter R1 remains greater than zero, loop instruction INST9 is "taken" operation, and program control jumps to target instruction INST2. The "loop body" (i.e., instructions INST2–INST8) is thereby repeatedly executed until loop counter R1 is decremented to zero, when the loop is "not-taken", and program control passes to fall-through instruction INST10.

Referring back to the top of FIG. 14, during execution of the software program, program counter 111 typically generates sequential program counter values NEXT_PC that are converted by MMU 112 to memory addresses used to sequentially access the memory locations in memory 101, thereby reading and processing the program instructions in the prearranged order. When branch or jump instructions (e.g., loop instructions) are executed, a non-sequential value (INJECTED_PC) is transmitted to program counter 111, and a corresponding non-sequential address is transmitted to memory 101. The thus-reset program counter/MMU then proceeds to generate sequential addresses subsequent to the injected address until another interruption occurs.

Referring again to FIG. 15, during "loop entry" (i.e., the first pass through the instructions preceding loop instruction INST9), pre-loop instructions INST0 and INST1 are executed (setting loop counter R1 to three), then the loop body is executed for the first time, then loop instruction INST9 is executed for the first time (indicated by the left-most arrow A in FIG. 15). As indicated, loop instruction INST9 decrements loop counter R1 to two (R1=2), determines that the value stored in loop counter R1 does not equal zero, and therefore causes a "loop taken" operation in which program control passes back to instruction INST2 (address X0010). "Inner loop" processing of the loop body is then performed during which loop counter R1 is decremented to one (R1=1) during a second iteration, and to zero (R1=0) during a third iteration, each time loop instruction INST9 causing another "loop taken" operation. "Loop exit" occurs when loop instruction INSTR9 is encountered for the fourth time and loop counter R1 equals zero, which results in a "loop not-taken" operation that passes program control to fall-through instruction INST10. Program execution then proceeds to sequentially execute instructions (e.g., instruction INST11 and then INST12) until another branch or jump is encountered.

A problem with processors that utilize instruction buffers (i.e., processors similar to processor 1400; discussed above) is that the conditional branch operation of a loop instruction (i.e., whether the loop instruction is taken or not-taken) is decided when the loop instruction is executed (e.g., when the loop instruction is issued to LS pipeline 132; see FIG. 14). As mentioned above, when loop instruction INST9 is taken, program control passes (jumps) to target instruction INST2. The problem is that, after fetching loop instruction INST9, program counter 111 and MMU 112 continue to fetch sequentially addressed instructions from memory 101 until the execution stage generates the injected counter value associated with target instruction INST2. That is, at the time loop instruction is executed, several fall-through instructions (e.g., INST10–INST12) have been fetched and stored in the various stages preceding execution stage 130, and target instruction INST2 has not yet been fetched. Accordingly, processor 1400 must wait after each loop iteration (i.e., each time loop instruction INST9 is executed) while target instruction INST2 and subsequent loop body instructions are fetched, passed through the various processor stages, and issued to execution stage 130. Consequently, each loop iteration produces a "loop taken penalty", which is typically measured by the number of processor clock cycles between executing the loop instruction and executing that loop's target instruction. The loop taken penalty is particularly large when, as in the case of processor 1400, a processor includes several stages and an instruction buffer (i.e., DIB 122) preceding the execution stage because of the number of processor clock cycles required for the target instruction to pass through these stages.

What is needed is a processor that is able to minimize the loop taken penalty. Ideally, what is needed is a "zero-overhead" processor that eliminates the loop taken penalty and executes loop instructions without consuming any execution cycles of the processor.

SUMMARY OF THE INVENTION

The present invention is directed to a processor that facilitates zero-overhead loop operation by predicting whether a cached loop instruction will be taken or not-taken during a next-sequential loop iteration, detecting when the cached loop instruction will be executed in the next-sequential iteration, and fetching either instructions from inside the loop body or fall-through instructions based on the taken/non-taken prediction. In particular, during loop iterations when the loop is taken, loop body instructions are fetched before the cached loop instruction is executed. Upon verifying the loop taken prediction, the already-fetched loop body instructions are immediately issued to the processor's execution pipeline. Accordingly, the present invention minimizes or eliminates the loop taken penalty typically associated with conventional processors by eliminating the "wasted" cycles between execution of the loop instruction and execution of the loop body. Further, during loop iterations when the loop is not-taken, fall-through instructions are fetched before the cached loop instruction is executed. Upon verifying the loop not-taken prediction, the already-fetched fall-through instructions are immediately issued to the processor's execution pipeline, thereby avoiding delays at loop exit.

According to an aspect of the present invention, a selected loop instruction and one or more of the selected loop's target instruction(s) (i.e., the actual target instruction and zero or more subsequent instructions from inside the loop body) are stored in a special loop cache buffer (LCB), which is distinct from the processor's instruction buffer (referred to as a decode instruction buffer (DIB)). In one embodiment, the loop instruction is detected in the processor's pre-decode stage at loop entry, and the target instruction(s) is immediately fetched upon detection. The target instruction(s) are then cached in the LCB upon subsequent arrival in the pre-decode stage. Each time the cached loop instruction is subsequently executed and a previous loop taken prediction is verified, the target instruction(s) are immediately issued from the LCB (as opposed to being issued from the DIB). By caching one or more target instructions in the LCB in this manner, potential processor delays associated with writing the target instruction(s) from system memory into the DIB are avoided. Further, by caching one or more target instructions in the LCB in this manner, delays associated with an incorrect loop not-taken prediction are minimized (i.e., because the target instruction(s) can be executed while the remaining loop body is fetched).

According to another aspect of the present invention trigger address and a post-target address are also stored in the LCB at loop entry. The trigger address is used in subsequent loop iterations to detect the end of the loop body (i.e., to trigger the next speculative pre-fetch of either loop body instructions or fall-through instructions). In one embodiment, the trigger address corresponds to the penultimate instruction in the loop body (i.e., the instruction immediately preceding the cached loop instruction), and the post-target address corresponds to the instruction within the loop body that is immediately subsequent to the last target instruction stored in the LCB. During processor operation, the stored trigger address is compared with program counter values generated by the processor's pre-fetch stage. When a match occurs and the loop is predicted taken, the post-target address is immediately issued to the pre-fetch stage. The thus-fetched post-target instructions (i.e., the loop body instructions other than those cached in the LCB) are subsequently issued from the DIB to the processor execution stage after the cached target instructions are issued from the LCB, thereby facilitating zero-overhead loop execution.

According to yet another aspect of the present invention, a processor includes both a "normal" execution stage (pipeline) and a special purpose loop execution circuit that is able to execute loop instructions when the execution stage is simultaneously executing one or more instructions from inside the loop body. In one embodiment, the loop execution circuit receives the cached loop instruction from the LCB along with an associated loop counter value. The loop execution circuit then verifies the previous taken/not-taken prediction (which is stored in the LCB), decrements the counter value, and then updates the taken/not-taken prediction for the next loop iteration. The prediction update is performed by determining whether the decremented counter value is greater than or equal to "1" (one), or equal to "0" (zero). If the decremented counter value is greater than or equal to one, then the next loop iteration is predicted taken. If the decremented counter value is equal to zero, then the next loop iteration is predicted not-taken. If the previous prediction is "loop taken" and the counter value is zero, then corrective action is initiated (e.g., fall-through instructions are fetched). If the previous prediction is "loop not-taken" and the counter value is equal to or greater than one, then the cached target instructions are issued, and the remaining loop body is fetched. The loop execution circuit also writes the decremented loop counter value back to its associated register.

According to yet another aspect of the present invention, one or more pointer values are stored in the LCB to coordinate issuance of instructions to the loop execution circuit and/or the execution stage. In one embodiment, a loop issue index (first) value is utilized to coordinate issuance of the cached loop instruction from the LCB into the loop execution circuit when the DIB issue pointer issues the penultimate instruction from the DIB into the execution stage. Accordingly, the cached loop instruction and penultimate instruction are executed simultaneously in the loop execution circuit and the "normal" processor execution stage, respectively. As mentioned above, if execution of the loop instruction verifies a previous loop taken prediction, then DIB issue control shifts to the target instructions cached in the LCB. In addition, a DIB pointer value is used to indicate the next instruction to be issued from the DIB after execution of the cached loop instruction. That is, the DIB pointer value identifies the DIB register containing the first post-target instruction (when loop taken) or the first fall-through instruction (when loop not-taken). The loop issue index value and the DIB pointer value are updated each loop iteration. Accordingly, these pointers provide a flexible and efficient method of coordinated issuance of instructions from the LCB and DIB that further facilitates zero-overhead loop operations.

According to yet another aspect of the present invention, a pre-fetch disable function is utilized for certain small loops (i.e., loops having bodies that can be entirely written into the LCB and DIB) in which the instruction fetching process is stalled while such small loops are executed. A pre-fetch disable bit stored in the LCB is set when a small loop is fetched, and the loop issue index and DIB pointer are utilized to repeatedly execute the loop body and cached loop instruction in the manner described above. Finally, the pre-fetch disable bit is turned off when a loop not-taken prediction is generated by the loop execution circuit, at which point fall-through instructions are fetched and written into the DIB in the manner described above. Accordingly, a highly efficient circuit is provided for executing small loops that would otherwise create a significant loop penalty in conventional processors.

According to yet another aspect of the present invention, a processor including two or more LCBs is controlled such that each LCB becomes "locked" (reserved) when that LCB generates a speculative pre-fetch operation, and becomes "unlocked" when the current taken/not-taken prediction is validated in the manner described above. When a larger number of loops are encountered than the number of LCBs, the assignment of an LCB to the most-recently encountered loop is determined according to a lockable modified least-recently-used (LRU) scheme. For example, when two LCBs are provided and two loops are respectively cached therein, then a third loop is encountered, the third loop is cached into one of the two LCBs under the following circumstances. When the third loop is located "below" (outside of) the first and second loops, then the first LCB to become "available" is utilized to cache the third loop (i.e., the LCB that was last used retains its loop information). When the third loop is nested within the first two loops, then the loop that has been iterated the lower number of times is replaced with the third loop.

According to yet another aspect of the present invention, in processors that fetch instructions using multi-instruction data words (e.g., instruction double words (IDWs)), the decision to cache a detected loop instruction is based, for example, upon the position of the loop instruction within its data word, and the presence of other cached loop instructions within the data word. Similarly, trigger addresses and post-target addresses are determined by the positions of the respective penultimate and post-target instructions inside the IDWs.

BRIEF DESCRIPTION OF THE DRAWINGS

These and other features, aspects and advantages of the present invention will become better understood with regard to the following description, appended claims, and accompanying drawings, where:

FIG. 11 is a simplified diagram depicting a portion of a software program including two nested loops;

FIGS. 12(A) and 12(B) are simplified diagrams depicting software program portions including three loops;

FIG. 13 is a state diagram showing a lockable modified least-recently-used (LRU) scheme that is utilized by the processor of FIG. 10;

DETAILED DESCRIPTION OF THE DRAWINGS

Figure 1:
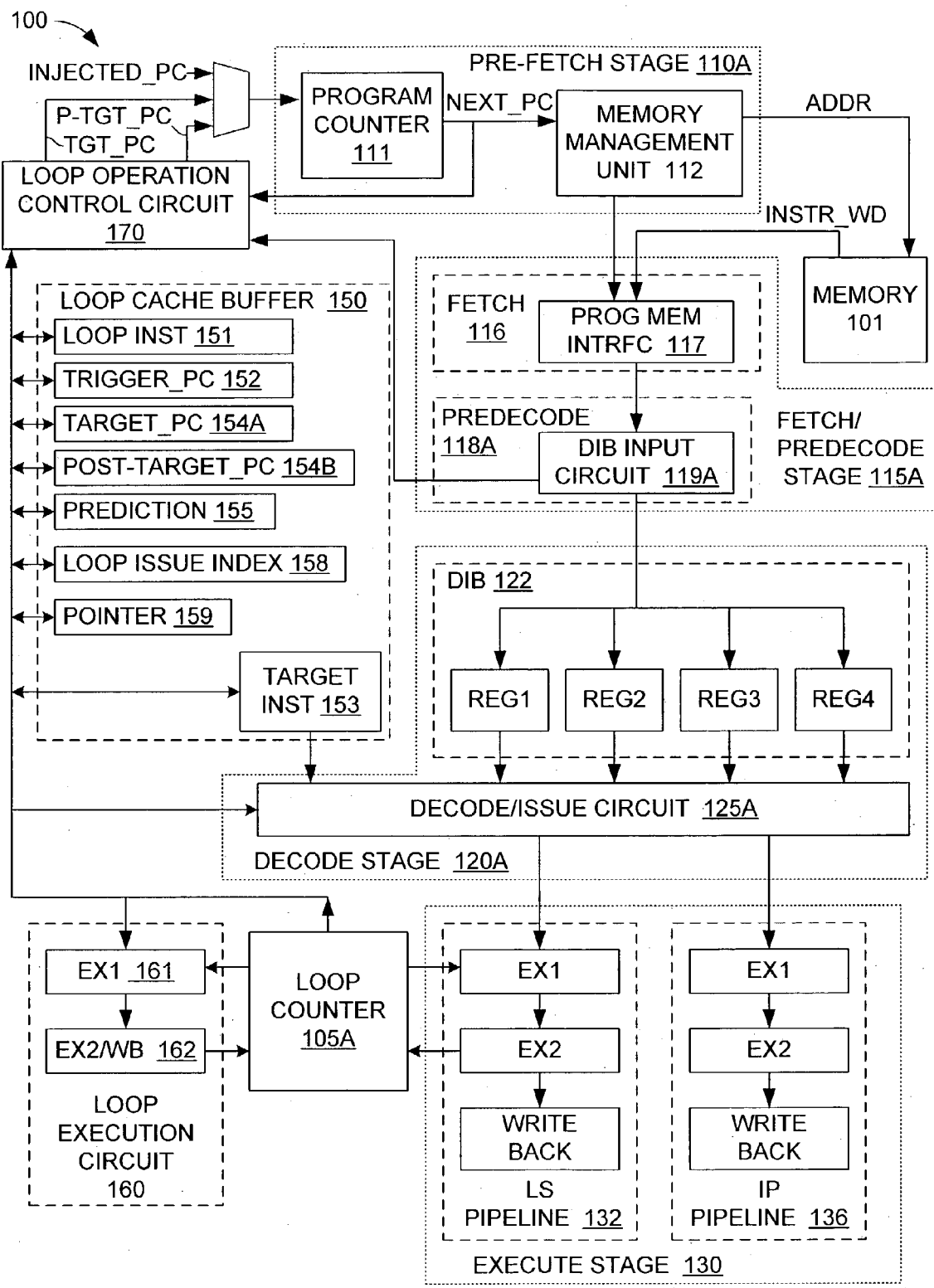
FIG. 1 is a block diagram showing a processor that facilitates zero-overhead loop operations according to a first embodiment of the present invention.
Figure 14:
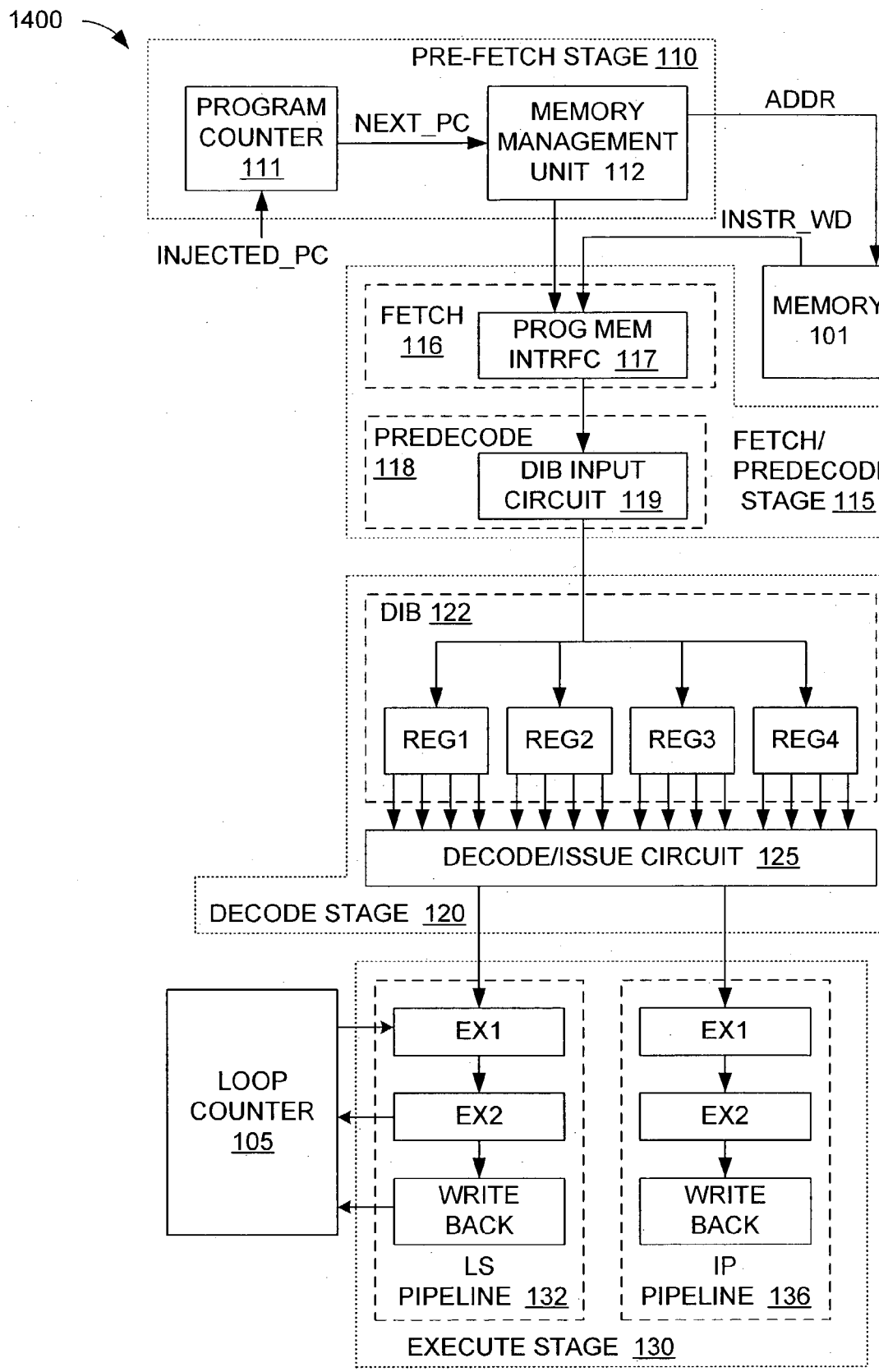
FIG. 14 is a block diagram showing a conventional microprocessor.

FIG. 1 is a block diagram showing a microprocessor (herein referred to simply as "processor") 100 that facilitates zero-overhead loop operations according to a simplified first embodiment of the present invention. Processor 100 is generally partitioned into a pre-fetch stage 110A, a fetch/pre-decode stage 115A, a decode stage 120A that includes a DIB (instruction buffer) 122, and an execution stage 130. Each of these stages and components thereof are identified with reference numbers similar to corresponding stages/components of conventional processor 1400 (described above with reference to FIG. 14), and functions essentially as described above (with the exceptions set forth below). Accordingly, detailed description of the essentially conventional functions performed by these stages/components is omitted below for brevity.

In addition to the essentially conventional stages/components mentioned above, processor 100 includes a loop cache buffer (LCB) 150, a loop execution circuit 160, and a loop operation control circuit 170 that cooperatively function to facilitate zero-overhead loop execution in the manner described below.

Loop Cache Buffer

Referring to the upper left side of FIG. 1, LCB 150 includes numerous data fields used to cache (store) various instruction data words and control data words/bits utilized by loop execution circuit 160 and loop operation control circuit 170 in the manner described below. These data fields include a loop instruction (LOOP INST) field 151, a trigger address (TRIGGER_PC) field 152, a target instruction (TARGET INST) field 153, a target address (TARGET_PC) field 154A, a post-target address (POST-TARGET_PC) field 154B, a loop taken/not-taken prediction (PREDICTION) field 155, a loop issue index field 158, and a DIB pointer field 159. The data stored in each of these fields is introduced below, and use of this data during operation of processor 100 is provided in subsequent examples.

Loop instruction field 151 is utilized to store information associated with a selected (cached) loop instruction. In particular, when a loop instruction is cached in the manner described below, the following information associated with the loop instruction is stored in loop instruction field 151: the operation code (opcode; i.e., information identifying the loop instruction type), data identifying whether the loop instruction is conditional or unconditional, the loop size (e.g., 16-bit or 32-bit), and the associated loop counter register. As described below, this information is then utilized to execute the cached loop instruction using loop execution circuit 160.

Trigger address field 152 is utilized to detect (or predict) when the loop instruction that is cached in field 151 is being fetched (or about to be fetched) in pre-fetch stage 110A. In one embodiment, trigger address field 152 is the actual or virtual memory address (or the program counter value) of the memory location either containing the cached loop instruction (when multiple instructions are read from memory 101 together; discussed further below) or the address of the penultimate instruction. For example, referring again to the exemplary loop of FIG. 15 and assuming one instruction is written per fetch cycle, if loop instruction INST9 is cached in loop instruction field 151, then trigger address field 152 may contain a value corresponding to memory address X1000 (i.e., the address associated with penultimate instruction INST8). The address stored in field 152 is updated only when the loop is being cached (i.e., during loop entry).

Target instruction field 153 is utilized to store the actual target instruction (and zero or more subsequent instructions) of the loop instruction cached in loop instruction field 151. For example, using the example of FIG. 15, if loop instruction INST9 is cached in field 151, then target instruction INST2 is cached in target instruction field 153. One or more subsequent instructions (i.e., INST3, INST4, etc.) may also be cached, depending on the size of target instruction field 153. In one actual embodiment, target instruction field 153 is sized to store instructions from two 64-bit multi-instruction words (instruction double-words (IDWs), which are addressed further below).

Target address field 154A is the actual or virtual memory address (or the program counter value) of the actual target instruction of the cached loop instruction. For example, if target instruction field 153 caches only target instruction INST2 (FIG. 15), then target address field 154A stores an address associated with target instruction INST2 (e.g., address X0010). Target address field 154A is utilized only during loop entry.

Post-target address field 154B is the actual or virtual memory address (or the program counter value) of the instruction immediately subsequent to the last instruction stored in target instruction field 153. For example, if target instruction field 153 caches only target instruction INST2 (FIG. 15), then post-target address field 154B stores an address associated with "post-target" instruction INST3 (e.g., address X0011). In another example, if target instruction field 153 caches both target instruction INST2 and instruction INST3, then post-target address field 154B stores address information identifying "post-target" instruction INST4 (e.g., address X0100). Note that target address field 154A and post-target address field 154B may be combined by adding a predetermined offset to the actual target address after loop entry.

Prediction field 155 stores data indicating a current prediction whether the cached loop instruction will be taken or not-taken during a next sequential iteration. In one embodiment, this taken/not-taken prediction is based on a loop counter value associated with the cached loop instruction that is decremented by one each time the cached loop instruction is executed, and predicts loop taken while the loop counter value is greater than or equal to one, and predicts loop not-taken when the loop counter value equals zero. For example, referring to the example provided in FIG. 15, prediction field 155 stores a "true" value (i.e., predicts loop taken) during the first three iterations (e.g., while loop counter R1 is equal to three, two, and one, respectively), and then switches to a "false" value (i.e., predicts loop not-taken) when loop counter R1 is decremented to zero. In one embodiment, prediction field 155 is always set to the "true" value at loop entry.

Loop issue index field 158 and DIB pointer field 159 are utilized during the issuance of loop instructions from loop instruction field 151 (or DIB 122) and target instructions from target instruction field 153. Loop issue index field 158 identifies the location of the cached loop instruction (during loop entry) and the penultimate loop instruction in DIB 122 (during all subsequent loop iterations). That is, during loop entry, loop issue index field 158 points to the DIB register storing the loop instruction. After loop entry, loop issue index field 158 is calculated each time the penultimate instruction is fetched (i.e., because this instruction may be located in a different DIB register each iteration). For example, assuming each register of DIB 122 stores only one instruction, if penultimate instruction INST8 (FIG. 15) is written into register REG2 during an inner loop iteration, then the value stored in loop issue index field 158 would indicate register REG2. DIB pointer 159 is utilized to indicate the location of the post-target instruction in DIB 122 after it is fetched using post-target address field 154B (discussed above). Similar to the loop issue index field 158, DIB pointer 159 is calculated each loop iteration. Loop issue index field 158 and DIB pointer 159 are discussed in additional detail below.

Additional data fields utilized for special purpose and multi-loop embodiments of the present invention are discussed below.

Loop Execution Circuit

Figure 2:
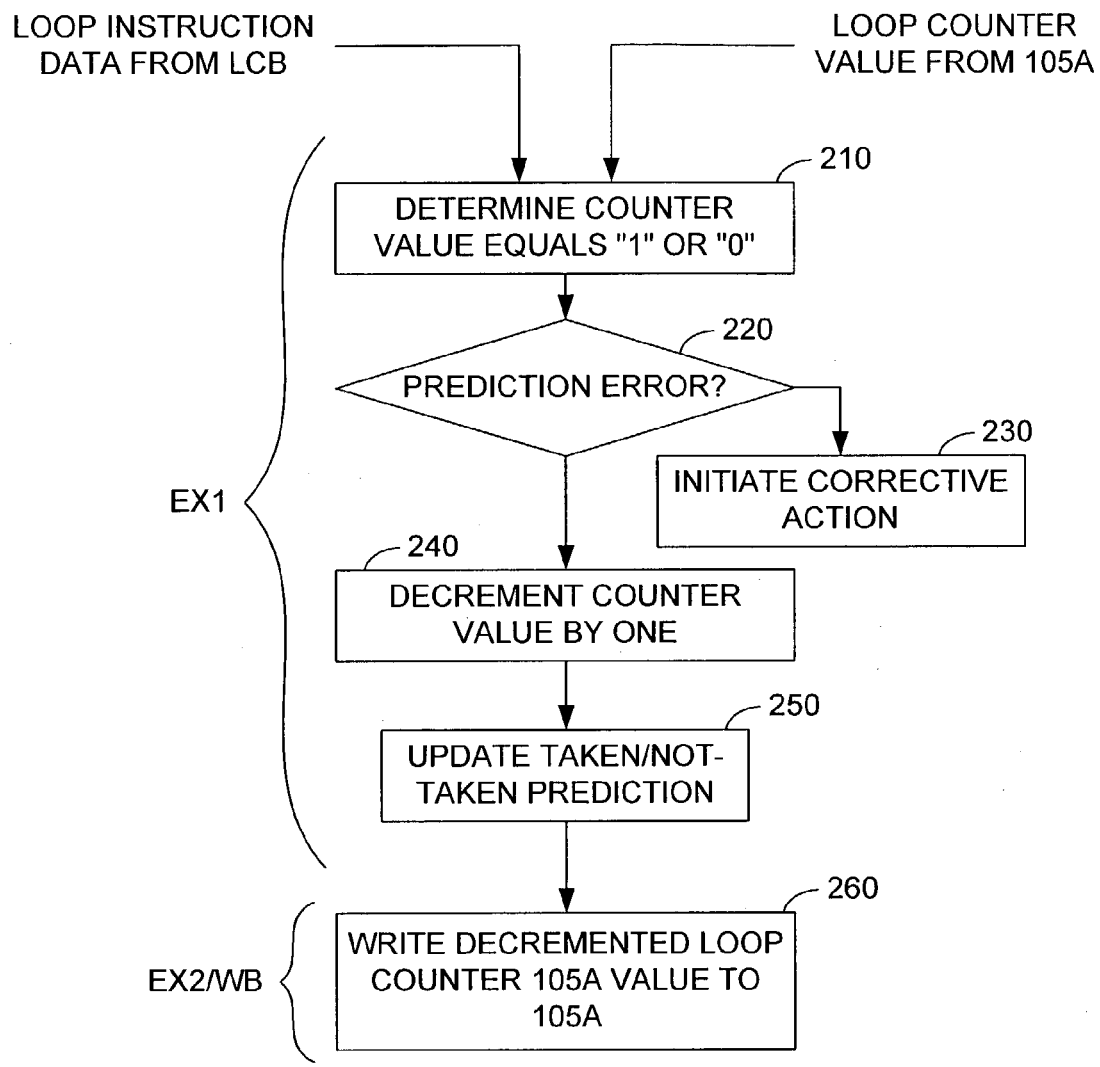
FIG. 2 is a simplified flow diagram depicting a function performed by a loop execution circuit of the processor shown in FIG. 1.

FIG. 2 is a flow diagram depicting a simplified representation of the function performed by loop execution circuit 160. Loop execution circuit 160 is a circuit specifically constructed to execute loop instructions outside of the general processor pipeline (i.e., outside of LS pipeline 132 and/or IP pipeline 136). As described in additional detail below, a newly cached loop instruction is executed in execution stage 130 during loop entry, but is executed by loop execution circuit 160 during all other iterations (including loop exit). Referring to the top of FIG. 2, a cached loop instruction is issued to loop execution circuit 160 from loop instruction field 151 of LCB 150 (discussed above), and an associated loop counter value is issued (read) from loop counter register 105A (both shown in FIG. 1). As indicated in FIG. 1, loop execution circuit 160 includes separate execution stages EX1 and EX2/WB ("WB" refers to "write-back"). Referring again to FIG. 2, stage EX1 is utilized to determine whether the counter value requires a prediction change (e.g., when the counter value is one; block 210). This determination is used to verify the previous taken/not-taken prediction (block 220), and is also utilized to initiate corrective action (e.g., fetching an unpredicted instruction and/or invalidating the current contents of LCB 150, as discussed below) if the previous taken/not-taken prediction is determined to be erroneous (block 230). The counter value is then systematically altered (e.g., decremented by one; block 240), an updated taken/not-taken prediction value is generated and stored in field 155 (block 250), and then the decremented address counter is written back to loop counter register 105A from stage EX2/WB (block 260). As set forth in additional detail below, loop execution circuit 160 facilitates zero-overhead operation by facilitating simultaneous execution of the cached loop instruction (in loop execution circuit 160) and the penultimate instruction (in execution stage 130).

Loop Operation Control Circuit

Loop operation control circuit 170 utilizes one or more finite state machines (FSMs) and associated circuitry to coordinate the operation of LCB 150 and loop execution circuit 160 with the operations of pre-fetch stage 110A, fetch/pre-decode stage 115A, decode stage 120A, and execution stage 130 in the manner described below. In one embodiment, loop operation control circuit 170 can be partitioned into three functional blocks: a pre-fetch block that interacts with pre-fetch stage 110A, a pre-decode block that interacts with fetch/pre-decode stage 115A, and an issue block that interacts with decode stage 120A. As set forth in the following example, the operations performed by these functional blocks differs depending upon the loop iteration being performed (i.e., loop entry, inner loop iterations, and loop exit).

Figure 3:
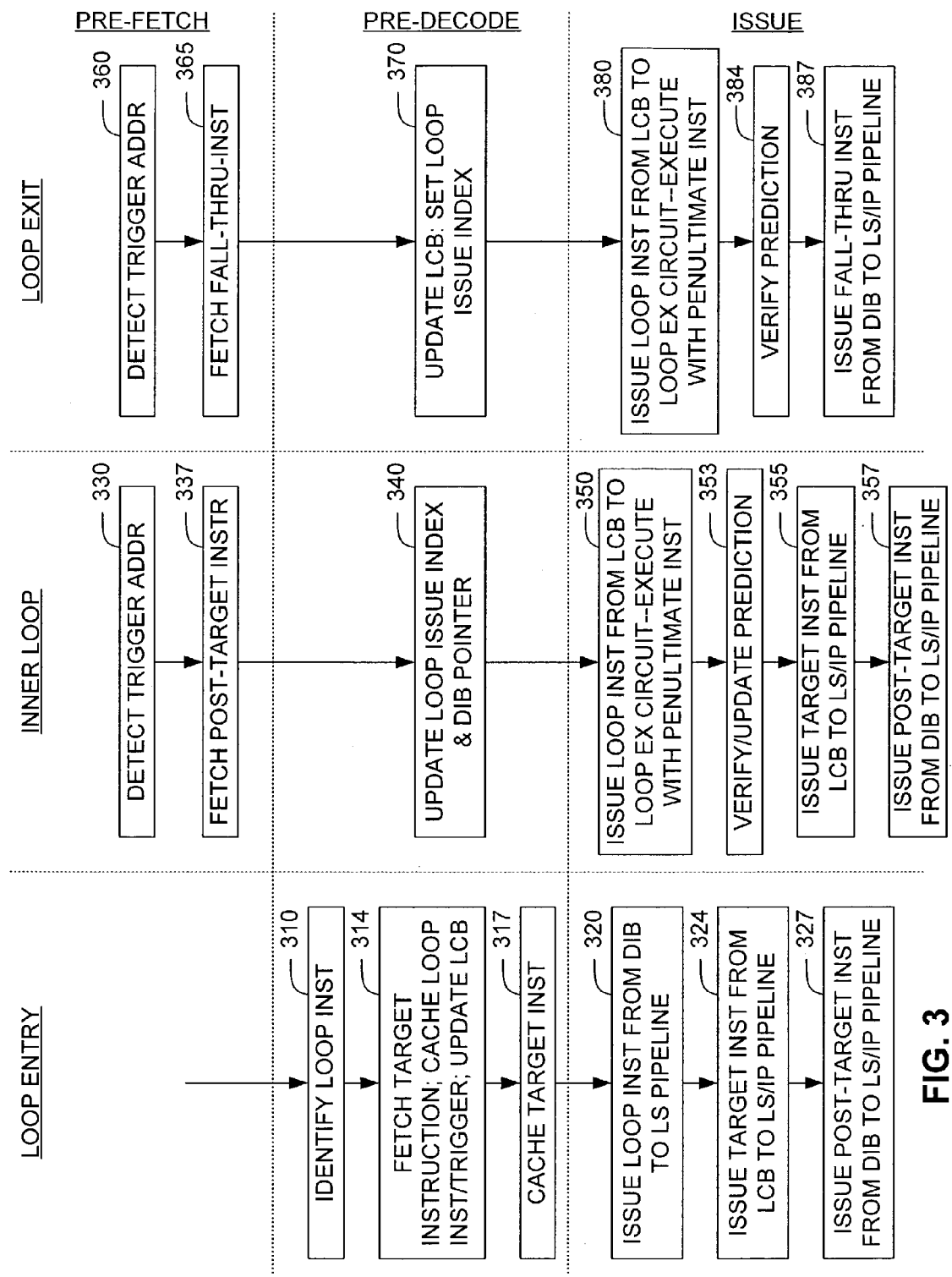
FIG. 3 is a simplified flow diagram depicting functions performed by a loop operation control circuit of the processor shown in FIG. 1.

FIG. 3 includes a series of flow diagrams depicting operations performed by loop operation control circuit 170 during loop entry (leftmost column), inner loop (center column), and loop exit (rightmost column), respectively, according to a simplified embodiment of the present invention. Further, operations associated with the pre-fetch functional block of loop operation control circuit 170 are positioned in the upper third of FIG. 3, operations associated with the pre-decode functional block of loop operation control circuit 170 are positioned in the middle third of FIG. 3, and operations associated with the issue functional block of loop operation control circuit 170 are positioned in the lower third of FIG. 3.

Figure 15:
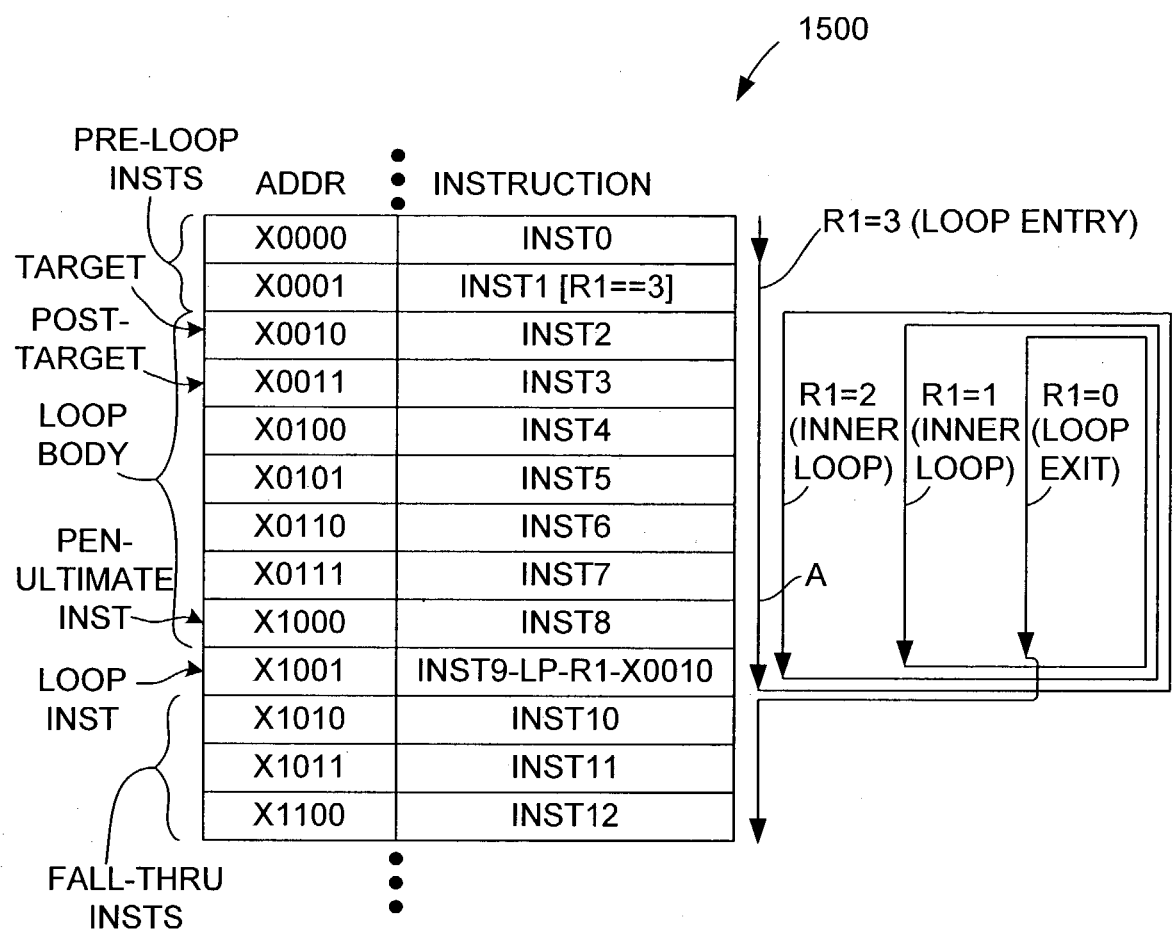
FIG. 15 is a simplified diagram depicting a portion of a software program including a loop.

The flow diagrams depicted in FIG. 3 are described below with reference to FIGS. 4(A) through 6(B), which in turn make reference to the exemplary software program portion 1500 depicted in FIG. 15. Note that the description below assumes that LCB 150 is initially "empty" (i.e., does not contain information related to previously cached loop instructions), and that a single, relatively long loop is executed by processor 100 without interruption (i.e., no injected instructions from asynchronous branches, traps, or other interrupt operations).

Loop Entry Phase

Referring to the leftmost column of FIG. 3, the loop entry phase of loop execution begins when a new loop instruction is identified (block 310), which in the present embodiment is performed by the pre-decode functional block of loop operation control circuit 170. After the loop instruction is identified and a decision is made to cache the loop instruction (e.g., by determining that the LCB is available), the loop instruction's target is fetched, and the loop instruction is used to update several fields of the LCB 150 (block 314)

Figure 4A:
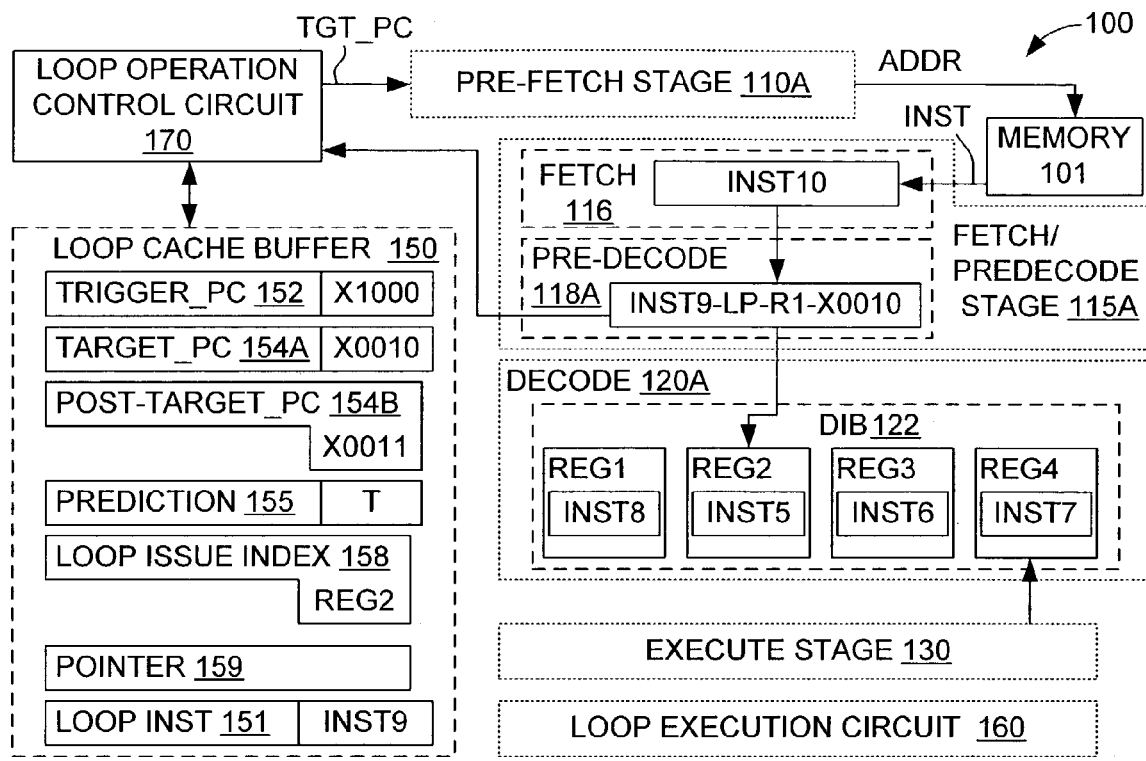
FIGS. 4(A), 4(B) and 4(C) are simplified representations of the processor shown in FIG. 1, and indicate specific operations performed during loop entry.

FIG. 4(A) is a block diagram showing a portion of processor 100 during the execution of the operations associated with blocks 310 and 314 according to a simplified embodiment. As indicated in FIG. 4(A), loop instruction INST9 is identified when it enters pre-decode stage 118A, for example, by comparing each instruction passing through pre-decode stage 118A with opcodes associated with known loop instructions. When the decision is made to cache loop instruction INST9, the address for target instruction INST2 (e.g., X0010) is passed by loop operation control circuit 170 to pre-fetch stage 110A. In addition, various information regarding loop instruction INST9 is stored in loop instruction field 151, the address of penultimate instruction INST8 (e.g., X1000) is stored in trigger address field 152, the post-target instruction (e.g., the address of instruction INST3, i.e., X0011) is calculated and stored in post-target address field 154B, the taken/not-taken prediction is set to loop-taken ("T"), and the loop issue index is set to DIB register REG2. Note that fall-through instruction INST10 is received in fetch stage 116 when loop instruction INST9 is identified and cached.

Referring again to FIG. 3, when the target instruction fetched in block 314 arrives in the pre-decode stage of the processor, it is cached in LCB 150 (block 317).

Figure 4B:
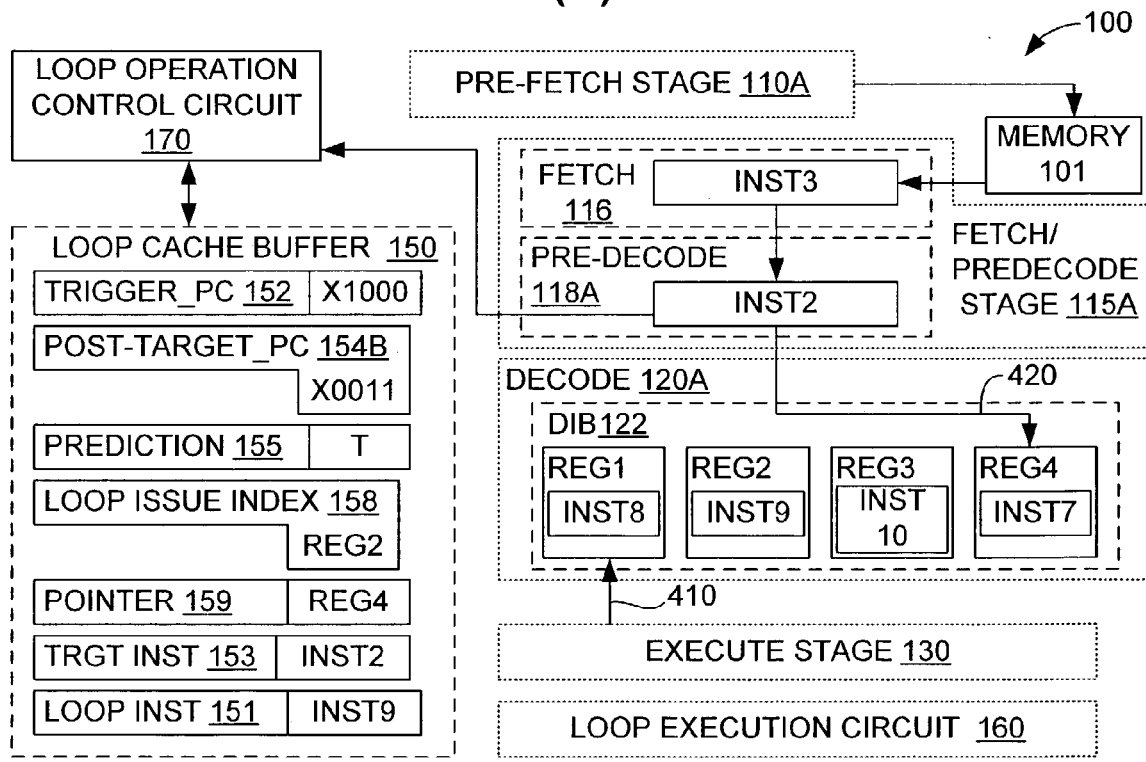

FIG. 4(B) is a block diagram showing processor 100 after the operation associated with block 314 according to the established simplified example. As indicated in FIG. 4(B), target instruction INST2 is written from pre-decode stage 118A into target instruction (TRGT INST) field 153, and DIB pointer field is updated to identify DIB register REG1 for reasons that will become clear below. Note that, at this point in the operation, an issue pointer 410 associated with decode stage 120A points to DIB register REG1, which currently stores penultimate instruction INST8. Note also that a DIB write pointer associated with pre-decode stage 118A points to DIB register REG4. In one embodiment, target instruction INST2 is written into DIB register REG4, but is issued from LCB 150, as discussed below.

Referring to the lower left portion of FIG. 3, operations associated with the issue functional block of loop operation control circuit 170 include issuing the loop instruction to the processor's execute pipeline (block 320), and then passing issue control to the LCB per the loop issue index to issue the target instruction(s) (block 324), and then passing issue control back to the DIB per the loop pointer to issue the post-target instructions (block 327).

Figure 4C:
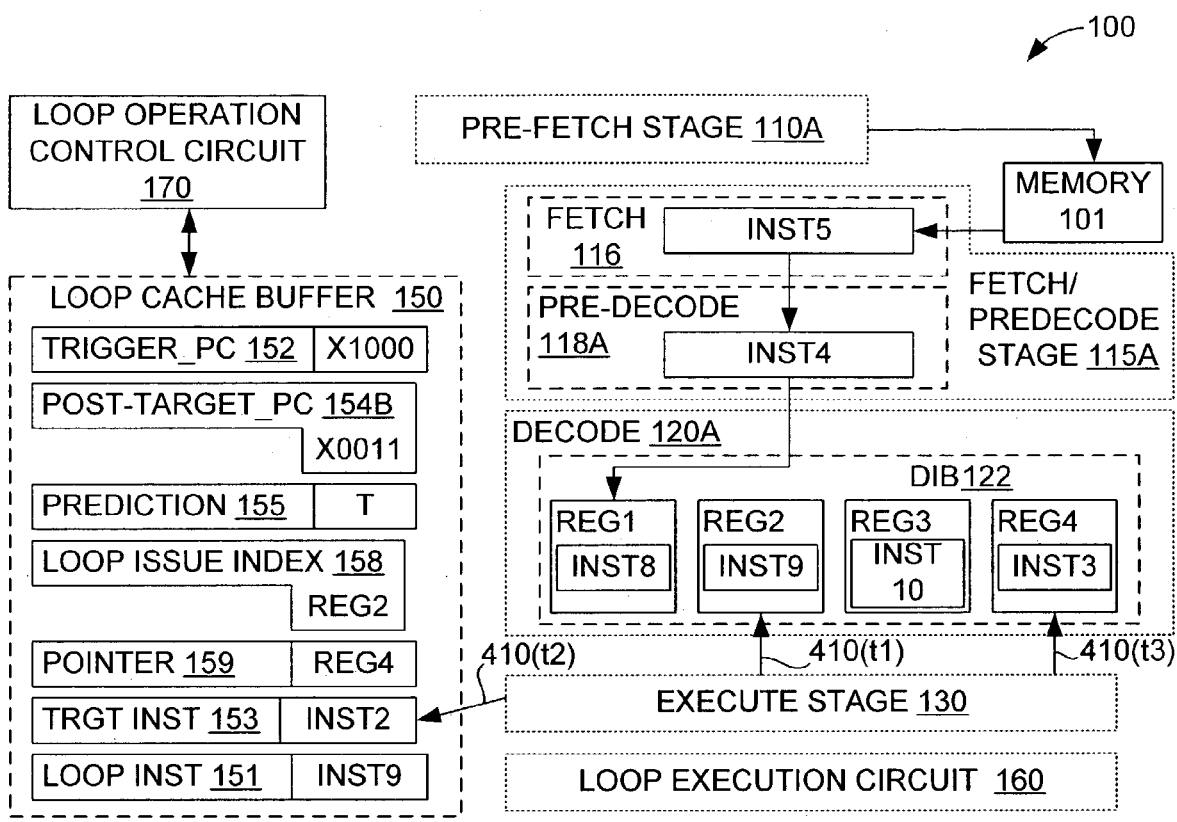

FIG. 4(C) is a block diagram showing processor 100 after the operation associated with blocks 320, 324, and 327 according to the established simplified example. As indicated in FIG. 4(C), upon reaching DIB register REG2 (i.e., the DIB register identified by loop issue index field 158), the DIB issue pointer issues loop instruction INST9 (indicated by issue pointer 410(t1)), then shifts issue control to target instruction register 153 and issues cached target instruction INST2 (indicated by issue pointer 410(t2)). Note that, in some processors, issuing the target instruction(s) from the LCB instead of the DIB may speed loop execution, thereby providing an advantage over processors that do not cache target instructions in a dedicated buffer. After issuing the target instruction(s), issue control is shifted back to DIB register REG4 per the value stored in DIB pointer field 159, thereby issuing post-target instruction INST3 (as indicated by issue pointer 410(t3)). Note that utilizing DIB pointer field 159 permits processor 100 to "skip" (i.e., not issue/execute) fall-through instruction INST10, which was written to DIB register REG3.

Inner Loop Phase

Referring to the top of the center column of FIG. 3, operations associated with the pre-fetch functional block of loop operation control circuit 170 during inner loop iterations will now be described. The inner loop iteration discussion provided below relates to that shown in FIG. 15 (i.e., where loop counter R1=2 or R1=1). As the instructions from the loop body are sequentially fetched and executed, the program counter eventually generates a value that matches the stored trigger address (block 330). Upon detection of the trigger address, because the current prediction is that the loop will be "taken", the pre-fetch functional block of the loop operation control circuit injects the cached post-target address (block 337), thereby resetting the program counter to a value associated with the loop's target instruction.

Figure 5A:
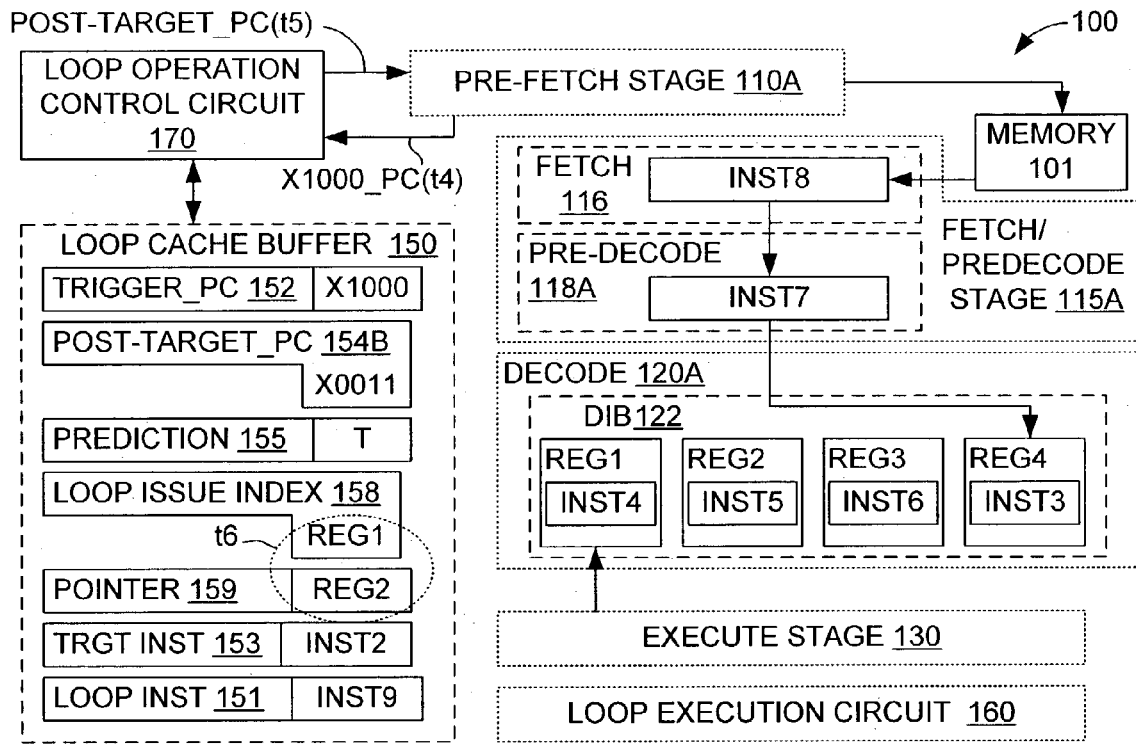
FIGS. 5(A) and 5(B) are simplified representations of the processor shown in FIG. 1, and indicate specific operations performed during inner loop operations.

FIG. 5(A) is a block diagram showing processor 100 after the operation associated with blocks 330 and 337 according to the established simplified example. As indicated in FIG. 5(A), the sequentially generated program counter values generated by pre-fetch stage 110A are monitored by loop operation control circuit 170 and matched with the value stored in trigger address field 152. When the program counter value associated with penultimate instruction INST8 (i.e., X1000_PC(t4)) is detected by loop operation control circuit 170, the post-target address (POST-TARGET_PC (t5)) stored in post-target address field 154B is transmitted to pre-fetch stage 110A, thereby causing pre-fetch stage to fetch post-target instruction INST3.

Referring to the middle of the center column of FIG. 3, operations associated with the pre-decode functional block of loop operation control circuit 170 during an inner loop iteration involves updating the loop issue index and DIB pointer (block 340). This operation is indicated by dashed oval t6 in FIG. 5(A). In particular, loop issue index field 158 is updated to identify DIB register REG1, and DIB pointer field 159 is updated to identify DIB register REG2.

Shown at the bottom of the center column of FIG. 3, operations associated with the issue functional block of loop operation control circuit 170 during an inner loop iteration begin with issuing the penultimate instruction from the DIB to the processor execution pipeline, and at the same time issuing the cached loop instruction from the LCB to the loop execution circuit (block 350). The loop execution circuit then processes the loop instruction in the manner described above to verify the previously established taken/not-taken prediction, and then generates an updated taken/not-taken prediction is provided for the next sequential loop iteration (block 353). Assuming the previous "taken" prediction was valid, then issue control is shifted to issue the target instruction cached in the LCB (block 355), and finally issue control is shifted to issue the post-target instruction cached in the DIB (block 357).

Figure 5B:
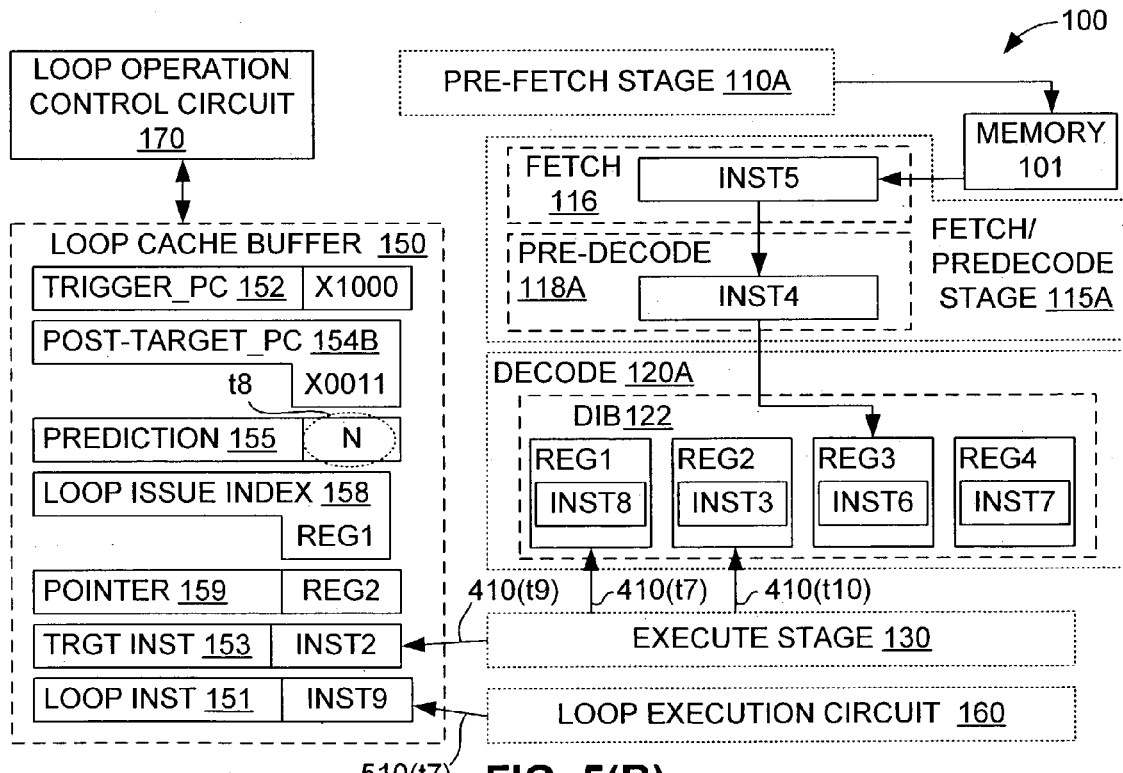

FIG. 5(B) is a block diagram showing processor 100 during the operations associated with blocks 350, 353, 355 and 337 according to the established simplified example. As indicated in FIG. 5(B), when issue pointer 410(t7) reaches DIB register REG1 (which is identified in loop issue index 158) and issues penultimate instruction INST8, loop instruction INST9 is issued from field 151 to loop execution circuit 160 (as indicated by loop execute pointer 510(t7)). Based on the example shown in FIG. 15, execution of cached loop instruction during the inner loop phase involves verifying the previous prediction (i.e., that the loop counter value is equal to one or greater, as in the present example), decrementing the loop counter, and then prediction field 155 is updated. Note that, per the example of FIG. 15, when the loop counter value is decremented from one to zero, prediction field 155 is changed to "not-taken" (N), as indicated by dashed oval t8. Subsequently, because the previous prediction was found valid, issue control shifts to target instruction field 153, as indicated by issue pointer 410(t9), and cached target instruction INST2 is issued to execution stage 130. Finally, issue control shifts back to DIB register REG2, per the value stored in DIB pointer field 159, and post-target instruction INST3 is issued to execution stage 130, as indicated by issue pointer 410(t10).

Loop Exit Phase

Referring to the top of the rightmost column of FIG. 3, operations associated with the issue functional block of loop operation control circuit 170 during loop exit will now be described. In the example introduced in FIG. 15, loop exit occurs when the loop counter R1 equals zero. Similar to the inner loop phase, loop exit begins by detecting transmission of the trigger address by the processor pre-fetch stage (block 360). Upon detection of the trigger address, because the current prediction is that the loop will be "not-taken", the pre-fetch functional block does nothing, and the pre-fetch stage generates the address associated with the loop's fall-through instructions (block 365).

Figure 6A:
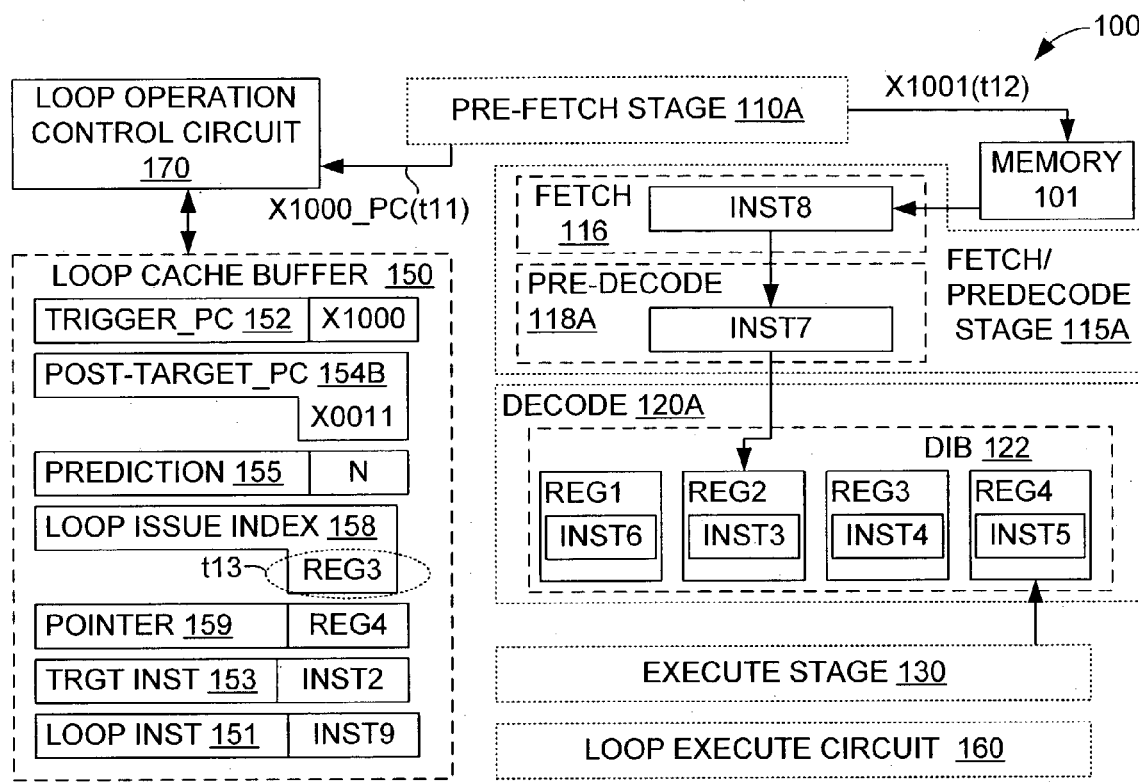
FIGS. 6(A) and 6(B) are simplified representations of the processor shown in FIG. 1, and indicate specific operations performed during loop exit.

FIG. 6(A) is a block diagram showing processor 100 after the operation associated with blocks 360 and 367 according to the established simplified example. As indicated in FIG. 6(A), the sequentially generated program counter values generated by pre-fetch stage 110A are monitored by loop operation control circuit 170 and matched with the value stored in trigger address field 152. When the program counter value associated with penultimate instruction INST8 (i.e., X1000_PC(t11)) is detected by loop operation control circuit 170, loop operation control circuit 170 does nothing because of the loop not-taken prediction (indicated by "N" in prediction field 155). Accordingly, as indicated on the right side of pre-fetch stage 110A, the next address (i.e., X10011(t12)) transmitted to memory 101 corresponds to fall-through instruction INST10.

Referring to the middle of the rightmost column of FIG. 3, operations associated with the pre-decode functional block of loop operation control circuit 170 during loop exit involve updating the loop issue index (block 370) in a manner similar to that described above with reference to inner loop iterations. In this example, as indicated by dashed oval t13 in FIG. 6(A), loop issue index field 158 is updated to identify DIB register REG3.

Shown at the bottom of the rightmost column of FIG. 3, similar to inner loop operations, the issue functional block of loop operation control circuit 170 during loop exit begins with issuing the penultimate instruction from the DIB to the processor execution pipeline, and at the same time issuing the cached loop instruction from the LCB to the loop execution circuit (block 380). The loop execution circuit then processes the loop instruction in the manner described above to verify the previously established not-taken prediction (block 384). Assuming the previous "not-taken" prediction was valid, issue control is then shifted to issue the first fall-through instruction cached in the DIB (block 387), thereby terminating loop operation. Note that issuing the first fall-through instruction may require skipping over one DIB register location storing a non-executed copy of the loop instruction (see discussion below regarding Processors Utilizing IDWs).

Figure 6B:
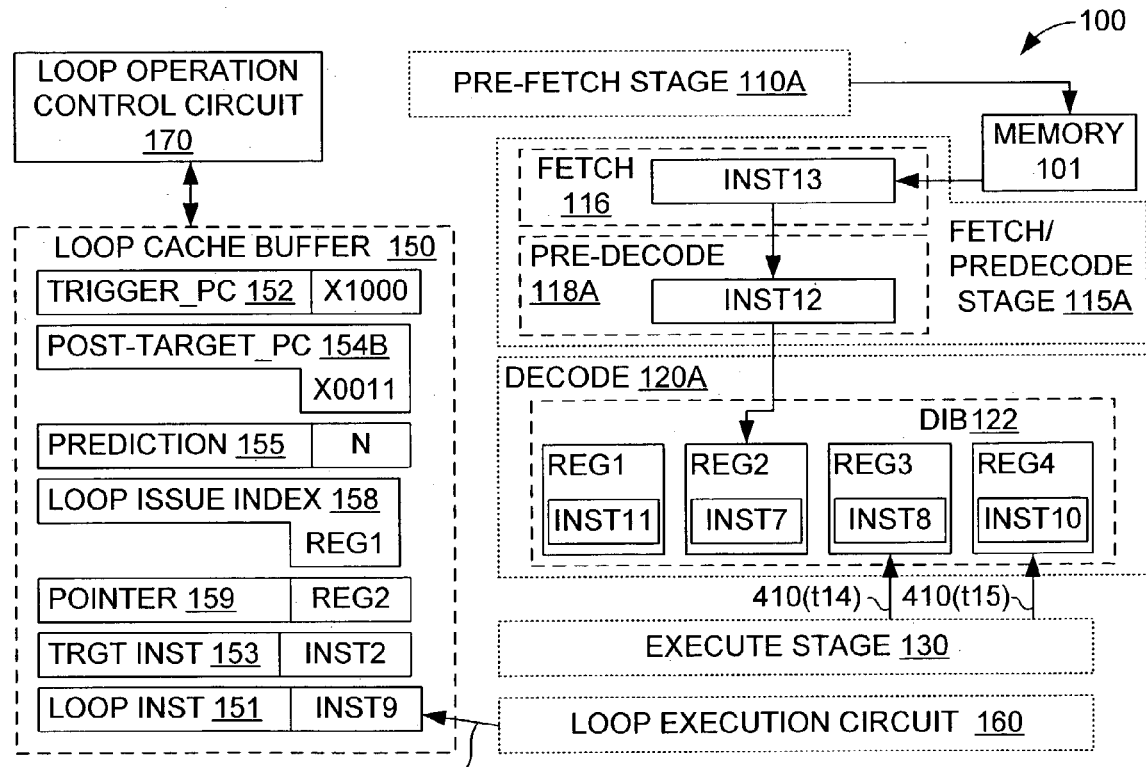

FIG. 6(B) is a block diagram showing processor 100 during the operations associated with blocks 380, 384, and 387 according to the established simplified example. As indicated in FIG. 6(B), when issue pointer 410(t14) reaches DIB register REG3 (which is identified in loop issue index 158) and issues penultimate instruction INST8, loop instruction INST9 is issued from field 151 to loop execution circuit 160 (as indicated by loop execute pointer 510(t14)). Based on the example shown in FIG. 15, execution of cached loop instruction includes verifying the previous not-taken prediction (i.e., that the loop counter value is equal to zero). Subsequently, because the previous prediction was found valid, issue control shifts to DIB register REG4, per the value stored in DIB pointer field 159, and fall-through instruction INST10 is issued to execution stage 130, as indicated by issue pointer 410(t15).

Special Cases

While processor 100 (as described above) facilitates zero-overhead operations involving a single, relatively long, uninterrupted loop instruction, several additional novel aspects of the present invention are also provided that address dealing with multi-instruction words and the occurrence of mispredicted loops, injected instructions from asynchronous branches or other interrupt mechanisms, small loops, zero body loops, and multiple (nested and non-nested) loop operations. Each of these special cases is described below.

Erroneous Taken/Not-Taken Predictions

According to another aspect of the present invention, the taken/not-taken prediction associated with a cached loop is determined from the current value of the loop counter, the systematic alteration of the loop counter value associated with the cached loop instruction, and an assumption that the loop counter value is not altered between executions of the cached loop instruction. Using the simplified example set forth above, because cached loop instruction INST9 is of the type that decrements loop counter R1 by one each iteration and exits when loop counter R1 equals zero, the loop is predicted not-taken in the next iteration when loop counter R1 is equal to zero. In all other cases (i.e., when loop counter R1 is equal to or greater than one), the subsequent loop iteration is predicted taken.

To prevent processor error due to mispredicted loop operation, loop operation control circuit 170 is provided with an error correction block that receives prediction verification signal(s) from loop execution circuit 170, and initiates error correction when a misprediction occurs (e.g., when the loop counter is altered inside the loop body). Such verification signals indicate two forms of error: first, the loop was predicted taken, but the counter value has a not-taken value (e.g., zero); and second, the loop was predicted not-taken, and the counter value has a taken value (e.g., one or greater).

Figure 7A:
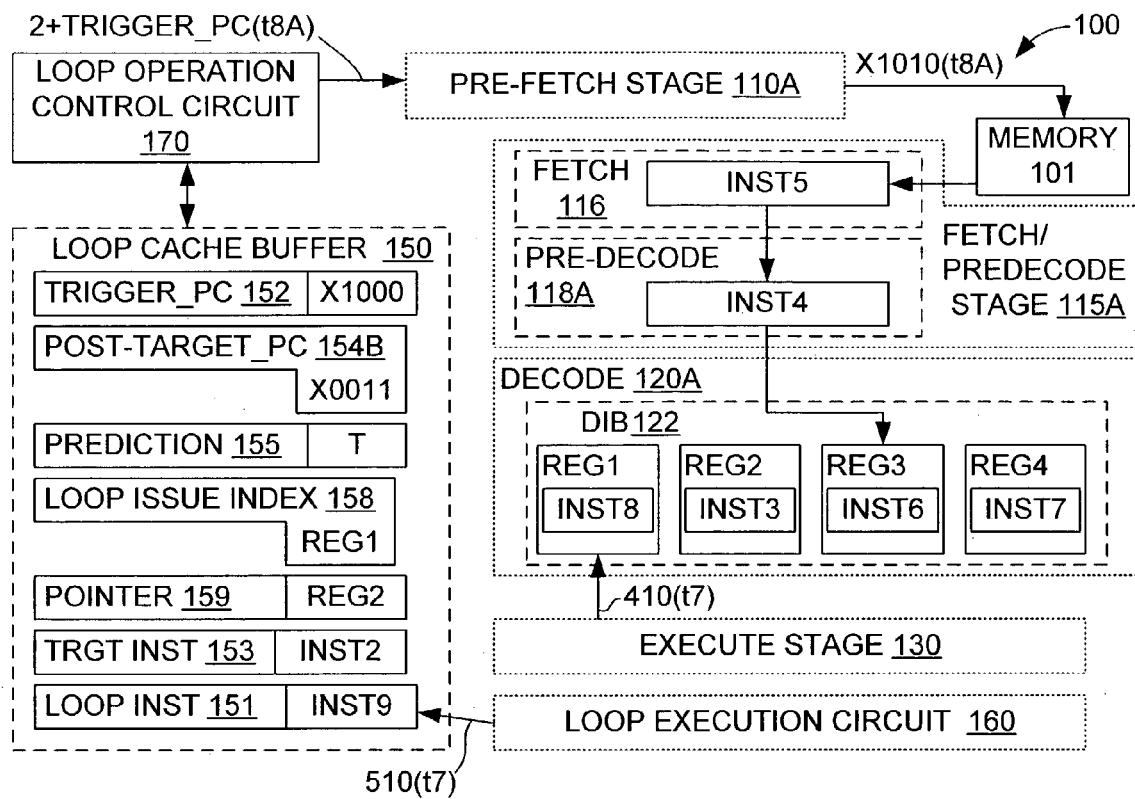
FIGS. 7(A) and 7(B) are simplified representations of the processor shown in FIG. 1, and indicate specific operations performed in response to erroneous loop taken and loop not-taken predictions.

FIG. 7(A) is a block diagram showing processor 100 during an inner loop operation (discussed above) illustrating the case where the exemplary loop was predicted taken, but the loop counter R1 is determined to be zero. As described above, when issue pointer 410(t7) issues penultimate instruction INST8, loop instruction INST9 is issued from field 151 to loop execution circuit 160 (as indicated by loop execute pointer 510(t7)). In this example, the loop counter value is zero (or a negative number) when the previous prediction is verified. Because the previous prediction stored in prediction field 155 is "taken" (T), the fetched instruction pointed to by DIB pointer 159 is post-target instruction INST3, which is incorrect due to the zero loop counter value.

To correct this error, loop operation control circuit 170 then injects program counter value 2+TRIGGER_PC(t8A), which causes pre-fetch stage to address fall through instruction INST10 (i.e., to generate address X1010(t8A). In addition, the issue pointer is reset upon detection of fall-through instruction INST10 in pre-decode stage 118A.

Figure 7B:
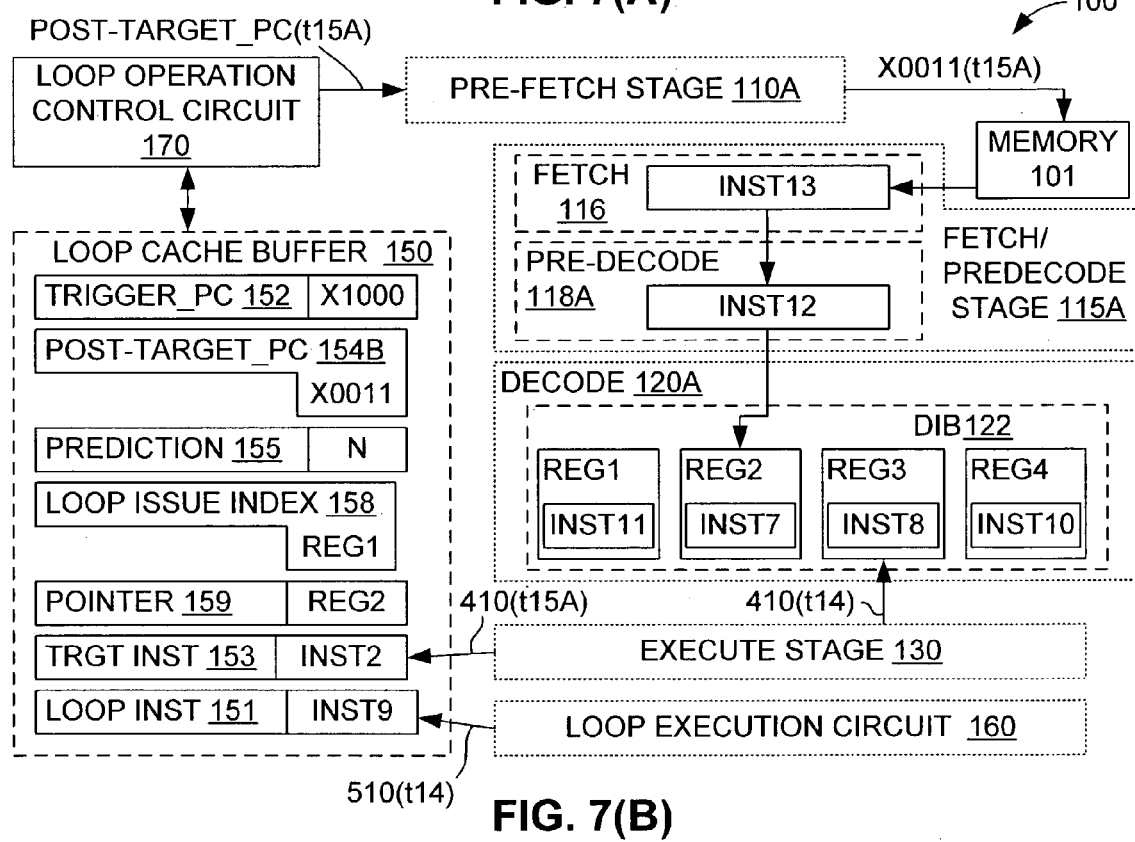

FIG. 7(B) is a block diagram showing processor 100 during a loop exit operation (discussed above) illustrating the case where the exemplary loop was predicted not-taken, but the loop counter R1 is determined to be greater than zero. In this case, issue pointer 410(t14) issues penultimate instruction INST8, and loop execute pointer 510(t14) issues loop instruction INST9 to loop execution circuit 160. In this example, the loop counter value is one (or another positive value) when the previous prediction is verified. Because the previous prediction stored in prediction field 155 is "not-taken" (N), the fetched instruction pointed to by DIB pointer 159 is fall-through instruction INST10, which is incorrect due to the positive loop counter value. To correct this error, loop operation control circuit 170 then injects program counter value POST-TRIGGER_PC(t15A), which causes pre-fetch stage to address post-trigger instruction INST3 (i.e., to generate address X0011(t15A)). Further, issue pointer 410(t15A) is shifted to target instruction field 153, from which target instruction INST2 is issued, and the DIB pointer is reset upon detection of target instruction INST3 in pre-decode stage 118A. Note that by storing multiple instructions in target instruction field 153, a penalty (delay) caused by such a misprediction can be avoided. That is, if instructions are issued from target instruction field 153 until the post-target instruction reaches DIB 122, then the mispredicted loop end results in zero processor delay.

Interruptions

According to another aspect of the present invention, a cached loop is invalidated when an asynchronous branch, trap, or other mechanism injects an instruction from outside the loop body during loop entry (i.e., before LCB 150 is fully updated). In one embodiment, an LCB valid bit is provided in LCB 150 to prevent operation using an incomplete LCB record. The valid bit is set to "false" when the LCB update process begins (e.g., in the state indicated in FIG. 4(A), where loop instruction INST9 is cached, but before target instruction INST2 is cached). This valid bit is switched to "true" upon completing the LCB update process (e.g., when target instruction INST2 is cached and the loop issue index and DIB pointer fields are updated). If an instruction from outside the loop body is detected in pre-decode while caching a loop instruction (i.e., during loop entry), then the valid bit is set to "false" and loop caching is terminated (i.e., control is switched to the injected instruction(s)). Other validity issues related to multiple loop operations are discussed with reference to the second embodiment set forth below.

Small Loops

Small loops (i.e., having a relatively small number of instructions) present a synchronization problem when the trigger address is detected indicating the start of a current iteration before the cached loop instruction from a previous iteration is executed. To address this situation, a prediction-valid bit is provided in the LCB that is utilized to synchronize operations of pre-fetch stage 110A with those of loop execution circuit 160. Each time a cached loop instruction is executed by loop execution circuit 160, the prediction valid bit is set to a "true" value (e.g., 1), and a subsequent fetch of the cached loop instruction (actually, the penultimate instruction) sets the prediction valid bit to a "false" value (e.g., 0). If both pre-fetch and execution occur simultaneously, then the prediction valid bit stays the same (execution cancels the effect of pre-fetch). However, in the case of some small loops, if the prediction valid bit is "false" when the trigger address is detected, then pre-fetch is stalled until prediction valid field 156 switches to "true".

According to another aspect of the present invention, certain small loops (e.g., less than five instructions in the simplified example set forth above) present a special case in that execution of such small loops using the process set forth above (i.e., fetching the loop body from memory 101 each loop iteration) could present unnecessary delays while the pipeline is filled. To avoid these delays, as set forth in the example provided below, the entire loop body is stored in target instruction field 153 (and in one or more registers of DIB 122, if necessary), and instruction fetching is disabled until loop exit (i.e., loop not-taken is predicted).

Figure 8:
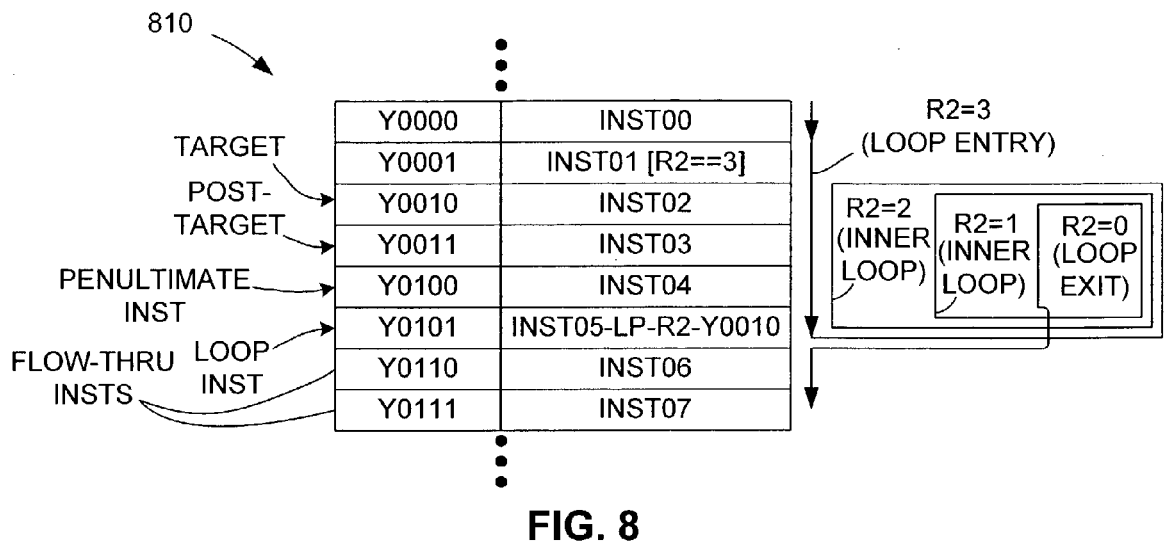
FIG. 8 is a simplified diagram depicting a portion of a software program including an exemplary small loop.

FIG. 8 is a simplified diagram depicting a portion 810 of a software program including a small loop formed by instructions INST02 through INST05. Similar to the example provided in FIG. 15, instruction INST01 sets a loop counter R2 to integer value three (indicated by "[R2=3]"), and loop instruction INST05 is a loop instruction that functions as described below.

Figure 9:
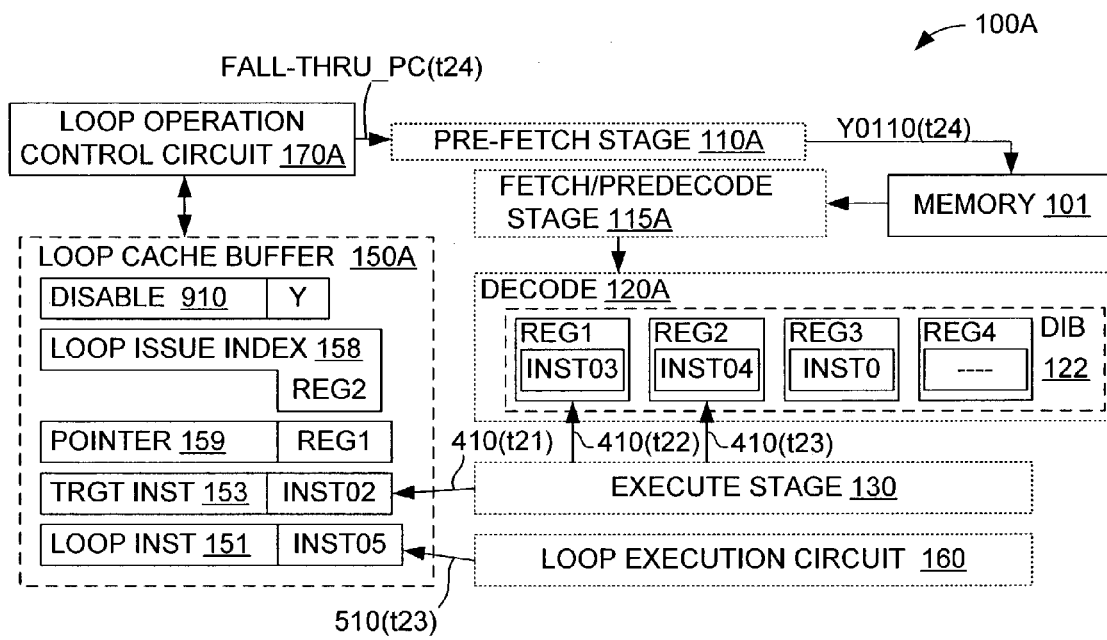
FIG. 9 is a simplified representations of a processor according to another embodiment, and indicates specific operations associated with the execution of the small loop depicted in FIG. 8.

FIG. 9 is a simplified block diagram showing a processor 100A for executing program portion 810 (FIG. 8) according to another embodiment of the present invention. Processor 100A is similar to processor 100 (described above) with the exception that LCB 150A includes a disable field 910 (all other stages and circuits operate essentially as described above). As mentioned above, when the small loop (e.g., instructions INST02 through INST05) of software program portion 810 are fetched from memory 101, disable field 910 is set to "true" (Y), and pre-fetching is stalled. As indicated in FIG. 9, at this point each instruction of the small loop is stored in either LCB 150A or DIB 122. In this example, loop instruction INST05 and target instruction INST02 are stored in associated fields of 150A, post-target instruction INST03 is stored in DIB register REG1, and penultimate instruction INST04 is stored in DIB register REG2. Loop issue index field 158 and DIB pointer 159 are stored permanently (i.e., until loop exit). Accordingly, inner loop iterations involve issuing target instruction INST02 from target instruction field 153 (indicated by pointer 410(t21)) after verifying a previous loop taken prediction, then shifting issue control to DIB register REG1 according to DIB pointer field 159 (as indicated by pointer 410(t22)), thereby issuing post-target instruction INST03. Issue control then proceeds to DIB register REG2 (as indicated by pointer 410(t23)), thereby issuing penultimate instruction INST04. Because DIB register REG2 matches the value stored in loop issue index field 158, loop instruction INST05 is also issued to loop execution circuit 160 from LCB 150A (as indicated by pointer 150(t23)), where the previous prediction is verified and a new prediction is generated. This process continues until the new prediction is "not-taken", wherein loop operation control circuit 170A injects the program counter for fall-through instruction INST06, thereby causing pre-fetch stage 110A to issue a corresponding address (i.e., Y0110(t24)).

Zero-Body Loops

A zero-body loop is a loop having no instructions in its body (i.e., the loop instruction loops onto itself). A loop whose target is ahead of the loop instruction is referred to herein as a forward loop. These two loop types are functionally supported (i.e., zero-overhead performance of these loop types is facilitated) in an embodiment of the present invention by providing an LCB bit to identify such loops. These loops are identified, for example, by comparing the target address with the trigger address when the loop instruction is cached. If the LCB bit indicates a zero-body loop instruction, then pre-fetch of the loop body is not initialized, and the loop instruction is treated like another branch instruction, in which case the loop target is injected by EX1 stage of LS pipeline if the loop counter is non-zero.

Multiple Loops

According to another aspect of the present invention, multiple loops (e.g., nested loops) are addressed by providing two or more LCBs, and modifying the loop operation control circuit to coordinate loop caching in the two LCBs.

Figure 10:
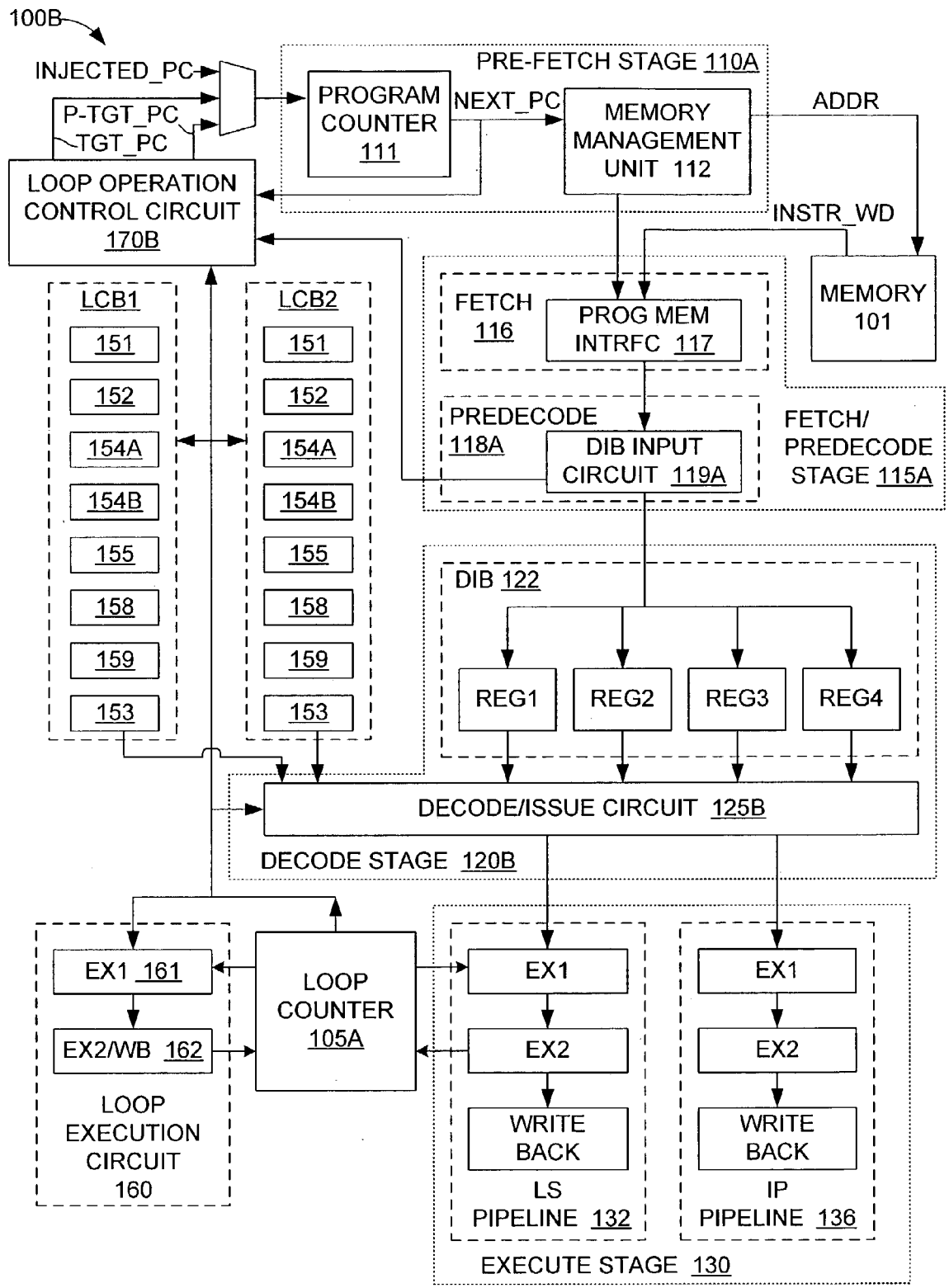
FIG. 10 is a block diagram showing a processor including multiple loop cache buffers according to another embodiment of the present invention.

FIG. 10 is a simplified diagram showing a processor 100B that facilitates zero-overhead loop operations according to another embodiment of the present invention. Processor 100B is similar to processor 100 (described above) with the exception that two LCBs (LCB1 and LCB2) are provided, with each of these LCBs including fields for storing the instruction, address and control data described above with reference to LCB 150. Other stages and components of processor 100B function essentially as described above (with the executions provided below).

FIG. 11 is a simplified diagram depicting a portion 1110 of a software program including two nested loops formed by instructions INST21 through INST31. When fetched by processor 100B, instructions INST21 through INST27 are sequentially fetched and executed in the manner described above. Upon detecting loop instruction INST28 for the first time (i.e., at a time t1), processor 100B checks for available LCBs (both are assumed available at this point in the example). Next, the loop formed by instructions INST24 through INST28 (referred to as the "nested loop") is cached and executed according to the process described above using LCB1 of processor 110B. In particular, processor 100B caches loop instruction INST28 in field 151 of LCB1, fetches target instruction INST24, writes the address of penultimate instruction INST27 into field 152 of LCB1, and writes the post-target address associated with post-target instruction INST24 into field 154B of LCB1. In addition, when pre-fetch of target instruction INST24 is initiated, a "lock" bit associated with LCB1 is set. When target instruction INST24 subsequently arrives in the pre-decode stage at a time t2, it is cached in field 153 of LCB1. The "lock" bit is turned off when the INST28 reaches to the EX1 (i.e. 161) stage of processor 100B, in which processor 100B validates the taken/not-taken predictionhe "lock" bit is turned off. The "lock" bit is subsequently turned on each time a speculatively pre-fetched target is written into DIB 122 (i.e., each time LCB1 is updated based on the target pre-fetched information—issue index & DIB pointer), and is turned off each time the current taken/not-taken prediction is validated in the manner described above. The nested loop is processed in this manner until loop exit, at which point control passes to instruction INST29. Note, however, that the values stored in LCB1 are retained.

Execution of program portion 1110 then proceeds until loop instruction INST31 is detected. Although LCB1 may be available, loop instruction INST31 is cached in field 151 of LCB2 at a time t3 (as indicated on the right side of FIG. 11). At this time, pre-fetch of target instruction INST21 is initiated as described above, and a "lock" bit associated with LCB2 is set. In addition, the address of penultimate instruction INST30 is stored in field 152 of LCB2, and the post-target address associated with post-target instruction INST22 is stored in field 154B of LCB2 based on information provided by loop instruction INST31. When target instruction INST21 subsequently arrives in the pre-decode stage at a time t4, it is also cached in field 153 of LCB2. As with LCB1, the "lock" bit associated with LCB2 is subsequently turned on each LCB2 update, and turned off each time the previous prediction is verified.

Sequential instruction processing then continues until penultimate instruction INST30 is detected for a second time (i.e., by comparing the issued program counter with the trigger address stored in field 152 of LCB2). Cached loop instruction INST31 is then issued from LCB1 and executed in the manner described above. If the outer loop is taken, issue control passes back to target instruction INST21 in the manner described above. Otherwise, control passes to fall-through instruction INST32.

Another multiple-loop situation arises when a larger number of loops are encountered in a program than the number of available LCBs. For example, when both LCB1 and LCB2 of processor 110B are in use and a third loop is encountered, processor 100B must determine whether to replace (overwrite) LCB1, replace LCB2, or simply not cache the third loop. As indicated by the simplified diagram shown in FIG. 12(A), when a third non-nested loop (i.e., including loop instruction LP-3) is located outside of the first two loops and both LCBs are not locked (i.e., the "lock" bits associated with both LCB1 and LCB2 are turned off), then the first available LCB (i.e., the LCB previously storing the loop associated with loop instruction LP-1) is replaced with loop instruction LP-3. In contrast, as indicated by the simplified diagram shown in FIG. 12(B), when the third loop is nested within the first two loops, the loop (LP-1 or LP-2) that is iterated the lower number of times is replaced. That is, in the case shown in FIG. 12(B), the LCB storing loop instruction LP-2 is replaced with loop instruction LP-3.

FIG. 13 is a state diagram showing a lockable modified least-recently-used (LRU) scheme that is utilized by loop operation control circuit 170B of processor 100B (FIG. 10) to assign LCB1 and LCB2 according to another aspect of the present invention. The LRU scheme includes four states: a state "0" (zero) in which neither LCB is cached, a state "1" (one) in which only LCB1 is cached, and states "2" (two) and "3" (three) in which both LCB1 and LCB2 are cached. When both LCBs are cached, control shifts between states "2" and "3" based upon which of the cached loops is iterated the most number of times (i.e., based on which LCBs are "hit").

Processors Utilizing IDWs

The description provided above utilizes greatly simplified examples for explanatory purposes. For instance, the examples provided above are directed to a simplified processor in which one instruction is read from system memory each fetch cycle. However, as mentioned above, some processors transfer instructions from system memory to the processor fetch/pre-decode stage using instruction double words (IDWs). These processors often pass the fetched IDWs (or rearranged portions thereof) through the processor stages until issuance from the DIB into the execution stage. For example, the TriCore microprocessor produced by Infineon Technologies AG is a dual-pipe RISC+DSP embedded processor that fetches 64 bits of address-aligned program code in every fetch request. These 64-bit program code IDWs are fetched into the processor's fetch/pre-decode stage in a manner similar to that described above. Each TriCore instruction can be either a 16-bit instruction or a 32-bit instruction, and is architecturally defined as either IP instruction (i.e., designated for execution in the IP pipeline)

or an LS instruction (e.g., loop instructions are LS instructions). When a 32-bit instruction is separated into two 16-bit parts that are transmitted in two sequential IDWs, the two parts are reassembled in the pre-decode stage before issuing to the DIB. During subsequent issuance, a maximum of two instructions are issued from the DIB to the execution stage per processor cycle (i.e., one 16-bit or 32-bit IP instruction to the IP pipeline, and/or one 16-bit or 32-bit LS instruction to the LS pipeline).

Since an IDW may have up to four instructions (I1, I2, I3, and I4). Any or all of these four instructions could be a cached or uncached loop instruction. Because only one loop target pre-fetch can be initiated at a time, a decision must be made regarding which loop instruction target to fetch for each IDW. In one embodiment, the decision to cache an uncached loop (L.U) is based on the arrangement of instructions I1–I4 within the IDW (i.e., as rearranged in the pre-decode stage) shown in Table 1 (below).

TABLE 1

| # | Inst I1 | Inst I2 | Inst I3 | Inst I4 |
|---|---------|---------|---------|---------|
| 1 | L.U | — | — | — |
| 2 | nL | L.U | — | — |
| 3 | nL | nL | L.U | — |
| 4 | nL | nL | nL | L.U |
| 5 | L.C.nT | L.U | — | — |
| 6 | L.C.nT | nL | L.U | — |
| 7 | L.C.nT | nL | nL | L.U |
| 8 | nL | L.C.nT | L.U | — |
| 9 | nL | L.C.nT | nL | L.U |
| 10 | nL | nL | L.C.nT | L.U |

Legend:
L = Loop instruction,
U = uncached,
nL = not-a-Loop,
C = cached,
nT = not-Taken(prediction), and
"—" = don't care.

Referring to Table 1 (above), each uncached loop (L.U) is only cached if the IDW (as rearranged in the pre-decode stage) belongs to one of above 10 types (each row of the table represents an IDW in pre-decode). For example, in case #1 of Table 1, if the uncached loop instruction is the first instruction (I1) in an IDW, then the loop instruction is cached (i.e., LCB update is qualified). Referring to case #5, if the first instruction (I1) is a cached loop that is predicted not-taken (i.e., L.C.nT) and the second instruction (I2) is an uncached loop, then the uncached loop instruction is cached (i.e., LCB update is qualified). The remaining cases indicate other arrangements in which uncached loops are cached. Note that, in addition to being positioned in an IDW as indicated in Table 1, loop caching would start only if an LCB is available (LCB availability is decided, for example, by the LRU shown in FIG. 13 and discussed above).

In addition to the decisions regarding loop caching (discussed above), the use of IDWs also requires modification to manner in which the fields of each LCB are defined. For example, in the case where each DIB register stores two IDWs and each LCB includes registers for storing two IDWs, then the loop issue index and DIB pointer must be modified to address each of the potential instruction addresses in these circuits. For example, a cached target instruction may be included in an IDW containing pre-loop instructions, all of which are cached in an associated LCB register. In this instance, a pointer is utilized to begin issuance from the actual location of the target instruction. Similarly, the trigger address of each cached loop instruction would fetch the actual loop instruction when both the loop instruction and the associated penultimate instruction are in the same IDW. Again, even if the fetched version of the cached loop instruction (and any fall-through instructions) reaches the DIB, the actual cached loop instruction is issued from the LCB. Although the present invention has been described with respect to certain specific embodiments, it will be clear to those skilled in the art that the inventive features of the present invention are applicable to other embodiments as well, all of which are intended to fall within the scope of the present invention. For example, target field 153 (FIG. 1) may be omitted, but failing to cache one or more target instructions may delay loop execution during loop entry, and may delay the execution of some smaller loops. Also, while the examples provided above are primarily directed to one type of processor and one type of loop instruction, those of ordinary skill in the art will recognize that novel aspects of the present invention can be utilized to provide zero-overhead operation of other processor types and for other loop instruction types.

The invention claimed is:

1. In a processor including a pre-fetch stage for fetching program instructions from a system memory device, and an execution stage for executing the fetched program instructions, a circuit for controlling an iterative execution of a group of said program instructions including a loop instruction and a target instruction, wherein each iteration begins with execution of the target instruction and ends with execution of the loop instruction, and wherein, upon executing the loop instruction at the end of each iteration, a loop counter value determines whether a new iteration is initiated and the target instruction is executed, or whether the iterative execution is terminated and a fall-through instruction is executed, the circuit comprising:

a loop cache buffer for storing selected instructions of the group of program instructions, said selected instructions including at least the loop instruction and the target instruction;

a predictor for predicting at the beginning of a first iteration whether a second iteration will be initiated at the end of the first iteration, or whether the iterative execution will be terminated at the end of the first iteration;

a detector coupled to the pre-fetch stage for detecting that a first predetermined instruction of the group of said program instructions has been fetched by the pre-fetch stage; and a pre-fetch stage controller for controlling the pre-fetch stage to fetch a second predetermined instruction of the group of said program instructions when said second iteration is predicted, and for controlling the pre-fetch stage to fetch the fall-through instruction when termination of the iterative execution is predicted, said second predetermined instruction being the first of the instructions which are to be executed after the first predetermined instruction and which is not stored in the loop cache buffer.

2. The circuit according to claim 1, wherein said predictor comprises a loop execution circuit for executing the loop instruction while the first predetermined instruction is executed in the execution stage.

3. The circuit according to claim 1, further comprising a memory for storing a current prediction value generated by said predictor, and a verifier for verifying said prediction at the end of the first iteration by comparing a counter value associated with the loop instruction with the current prediction value.

4. The circuit according to claim 1, wherein said predictor comprises a reader for reading a loop counter value associated with said loop instruction from a predefined register, a decrementor for decrementing the loop counter value, and a writer for writing the decremented loop counter value in the predefined register.

5. The circuit according to claim 1, wherein said loop cache buffer further stores a memory field for storing a trigger address value, and a comparing the trigger address value with address values generated by the pre-fetch stage.

6. The circuit according to claim 5,
wherein the pre-fetch stage includes a program counter for generating a series of program counter values, and a memory management unit for generating memory address values in response to the series of program counter values, and
wherein the comparator includes a comparator for comparing the series of program counter values with the trigger address value.

7. The circuit according to claim 6, wherein said pre-fetch stage controller comprises a resetter for resetting the program counter such that the memory management unit generates an address corresponding to the second predetermined instruction.

8. A method for operating a processor including a pre-fetch stage for fetching program instructions from a system memory device, an execution stage for executing the fetched program instructions, and a circuit for controlling an iterative execution of a group of said program instructions including a loop instruction and a target instruction, wherein each iteration of an iterative execution of said group of instructions begins with execution of the target instruction and ends with execution of the loop instruction, and wherein, upon executing the loop instruction at the end of each iteration, a loop counter value determines whether a new iteration is initiated and the target instruction is executed, or whether the iterative execution is terminated and a fall-through instruction is executed, wherein the method comprises the steps of:
storing selected instructions of the group of program instructions in a loop cache buffer, said selected instructions stored in said loop cache buffer including at least the loop instruction and the target instruction;
predicting at the beginning of a first iteration whether a second iteration will be initiated at the end of the first iteration, or whether the iterative execution will be terminated at the end of the first iteration;
detecting that a first predetermined instruction of the group of said program instructions has been fetched by the pre-fetch stage; and
speculatively fetching either a second predetermined instruction of the group of said program instructions when said second iteration is predicted, or the fall-through instruction when termination of the iterative execution is predicted, said second predetermined instruction being the first of the instructions which are to be executed after the first predetermined instruction and which is not stored in the loop cache buffer.

9. The method according to claim 8, wherein the predicting step further comprises executing the loop instruction using a loop execution circuit while executing the first predetermined instruction using the execution stage.

10. The method according to claim 8, further comprising the steps of storing a current prediction value before the first iteration, and verifying said prediction at the end of the first iteration by comparing a counter value associated with the loop instruction with the current prediction value.

11. The method according to claim 8, wherein the predicting step further comprises the steps of reading a loop counter value associated with said loop instruction from a predefined register, decrementing the loop counter value, and writing the decremented loop counter value in the predefined register.

12. The method according to claim 8, wherein the detecting step further comprises the steps of storing a trigger address value, and comparing the trigger address value with address values generated by the pre-fetch stage.

13. The method according to claim 12,
wherein the pre-fetch stage includes a program counter for generating a series of program counter values, and a memory management unit for generating memory address values in response to the series of program counter values, and
wherein the detecting step further comprises the step of comparing the series of program counter values with the trigger address value.

14. The method according to claim 13, wherein the speculatively fetching step further comprises the step of resetting the program counter such that the memory management unit generates an address corresponding to the second predetermined instruction.

15. In a processor including a pre-fetch stage for fetching program instructions from a system memory device, an instruction buffer for storing a plurality of program instructions, an execution stage for executing the program instructions sequentially issued from the instruction buffer, a circuit for controlling an iterative execution of a group of said program instructions including a loop instruction and a target instruction, wherein each iteration begins with execution of the target instruction and ends with execution of the loop instruction, a loop counter memory for storing a loop counter value, and a circuit comprising:
a loop cache buffer for storing selected instructions of the group of program instructions, said loop cache buffer including a first memory field for storing the loop instruction, and a second memory field for storing the target instruction associated with the loop instruction;
a loop execution circuit for executing the selected loop instruction, for updating the loop counter value stored in the loop counter memory, and for generating a loop taken control signal when the loop counter is equal to a predetermined value;
an issuer for issuing the target instruction from the second memory field to the execution stage when the loop execution circuit generates the loop taken control signal; and
a controller for controlling the pre-fetch stage to fetch the first of the instructions which are to be executed after the target instruction and which is not stored in the loop cache buffer when the loop execution circuit generates the loop taken control signal.

16. The circuit according to claim 15,
wherein the loop cache buffer further includes a trigger address field for storing a first address value corresponding to a penultimate instruction of a loop body associated with the selected loop instruction, and a post-target address field for storing a second address value corresponding to a post-target instruction of the loop body; and
wherein the processor further comprises:
a pre-fetch stage for fetching program instructions by transmitting address values to a system memory device; and a comparator for comparing the first address value with the address values transmitted by the pre-fetch stage, and for causing the pre-f etch stage to transmit the second address value when the first address value matches a current address value transmitted by the pre-fetch stage.

17. The circuit according to claim 16, further comprising an issuer for simultaneously issuing the penultimate instruction from the instruction buffer to the execution stage and issuing the selected loop instruction to the loop execution circuit.

18. A method for operating a processor including a prefetch stage for fetching program instructions from a system memory device, an instruction buffer for storing a plurality of program instructions, an execution stage for executing the program instructions sequentially issued from the instruction buffer, a circuit for controlling an iterative execution of a group of said program instructions including a loop instruction and a target instruction, wherein each iteration begins with execution of the target instruction and ends with execution of the loop instruction, a loop cache buffer for storing selected instructions of the group of program instructions, and a loop counter memory for storing a loop counter value, the method comprising the steps of:
 storing the loop instruction in a first memory field,
 storing the target instruction in a second memory field,
 executing the loop instruction including updating the loop counter value stored in the loop counter memory, and generating a loop taken control signal when the loop counter is equal to a predetermined value;
 issuing the target instruction from the second memory field to the execution stage when the loop execution circuit generates the loop taken control signal; and
 controlling the pre-fetch stage to fetch the first of the instructions which are to be executed after the target instruction and which is not stored in the loop cache buffer when the loop execution circuit generates the loop taken control signal.

19. The method according to claim 18, wherein the processor further includes a pre-fetch stage for fetching program instructions by transmitting address values to a system memory device, and wherein the method further comprises the steps of:
 storing a first address value and a second address value, the first address value corresponding to a penultimate instruction of a loop body associated with the selected loop instruction, and the second address value corresponding to a post-target instruction of the loop body;
 comparing the first address value with the address values transmitted by the pre-fetch stage; and
 causing the pre-fetch stage to transmit the second address value when the first address value matches a current address value transmitted by the pre-fetch stage.

20. The method according to claim 19, further comprising the step of simultaneously issuing the penultimate instruction from the instruction buffer to the execution stage and issuing the selected loop instruction to the loop execution circuit.

21. In a processor including a pre-fetch stage for generating address values utilized to fetch program instructions from a system memory device, and an execution stage for executing the fetched program instructions, a circuit for iteratively executing a loop body including a plurality of instructions, wherein each execution of the loop body begins with execution of a target instruction and ends with execution of a loop instruction, the circuit comprising:
 a loop cache buffer for storing selected instructions of the plurality of instructions, said selected instructions including at least the loop instruction and target instruction;
 a memory for storing a trigger address value associated with a first instruction of the loop body during a first iteration of the loop body;
 a detector for detecting the first instruction during a subsequent iteration of the loop body by comparing the address values generated by the pre-fetch stage with the stored trigger address value; and
 a pre-fetch stage controller for controlling the pre-fetch stage to fetch a second instruction of the loop body when the first instruction is detected during a subsequent iteration and a further iteration is to be executed, and for controlling the pre-fetch stage to fetch a fall-through instruction when no further iteration is to be executed, said second instruction being the first of the instructions which are to be executed after the first instruction and which is not stored in the loop cache buffer.

22. The circuit according to claim 21,
 wherein said memory includes a memory field for storing a post-target address associated with a second instruction of the loop body, and
 wherein said detector further comprises a transmitter for transmitting the post-target address to the pre-fetch stage upon detection of the first address.

23. A method for operating a processor including a pre-fetch stage for generating address values utilized to fetch program instructions from a system memory device, and an execution stage for executing the fetched program instructions, a circuit for iteratively executing a loop body including a plurality of instructions, wherein each execution of the loop body begins with execution of a target instruction and ends with execution of a loop instruction, the method comprising the steps of:
 storing selected instructions of the plurality of instructions, said selected instructions including at least the loop instruction and the target instruction;
 storing a trigger address value associated with a first instruction of the loop body during a first iteration of the loop body;
 detecting the first instruction during a subsequent iteration of the loop body by comparing the address values generated by the pre-fetch stage with the stored trigger address value; and
 controlling the pre-fetch stage to fetch a second instruction of the loop body when the first instruction is detected during a subsequent iteration and a further iteration is to be executed, and controlling the pre-fetch stage to fetch a fall-through instruction when no further iteration is to be executed, said second instruction being the first of the instructions which are to be executed after the first instruction and which is not stored in the loop cache buffer.

24. The method according to claim 23, further comprising the steps of:
 storing, during the first iteration, a post-target address associated with the second instruction of the loop body, and
 upon detecting the first address, initiating a speculative pre-fetch of the second instruction by transmitting the post-target address to the pre-fetch stage.

25. A processor comprising:
 a pre-fetch stage for fetching a plurality of program instructions from a system memory device;

an instruction buffer including a plurality of registers for temporarily storing the fetched program instructions;

an execution stage for executing program instructions systematically issued from the instruction buffer;

a loop cache buffer for storing selected loop instructions of the plurality of program instructions, wherein the loop cache buffer includes a first memory field for storing a target instruction, and a second memory field for storing a first pointer value indicating a first register location of said instruction buffer, and a third memory field for storing a second pointer value indicating a second register location of said instruction buffer; and a loop execution circuit for executing the selected loop instructions stored in the loop cache buffer;

an issuer for issuing the loop instruction from the loop cache buffer to the loop execution circuit when a predetermined instruction is issued from the instruction register to the execution stage, and for subsequently issuing the target instruction from the first memory field of the loop cache buffer to the execution stage, wherein the issuer comprises:

a detector for detecting when an issue pointer position of the instruction buffer is equal to first register location indicated by the first pointer value; and a changer for changing the issue pointer position to the second register position indicated by the second issue pointer after the target instruction is issued from the loop cache buffer.

26. The processor according to claim 25, wherein the plurality of program instructions includes a loop instruction, a target instruction, and a second plurality of post-target instructions sequentially arranged between the loop instruction and the target instruction, and wherein the processor comprises a disabler for disabling the pre-fetch stage when the second plurality of post-target instructions is equal to or less than the plurality of registers of said instruction buffer.

27. A processor comprising:

a pre-fetch stage for fetching a plurality of program instructions from a system memory device;

an execution stage for executing at least some of the fetched program instructions;

a loop execution circuit;

a first loop cache buffer including a first loop instruction field;

a second loop cache buffer including a second loop instruction field;

an assignor for assigning a first loop instruction to the first loop instruction field of the first loop cache buffer, and for assigning a second loop instruction to the second loop instruction field of the second loop cache buffer; and an issuer for selectively issuing the first and second loop instructions from the first and second loop cache buffers, respectively, to the loop execution circuit.

28. The processor according to claim 27, wherein the first loop cache buffer further comprises a post-target address field, and wherein the processor further comprises:

an initiator for initiating a speculative pre-fetch process including transmitting the post-target address to the pre-fetch stage; and a preventor for preventing assignment of the first loop cache buffer to a third loop instruction between the initiation of the speculative pre-fetch process until the execution of the first loop instruction by the loop execution circuit.

* * * * *

UNITED STATES PATENT AND TRADEMARK OFFICE
CERTIFICATE OF CORRECTION

| | |
|---|---|
| PATENT NO. | : 7,159,103 B2 |
| APPLICATION NO. | : 10/396063 |
| DATED | : January 2, 2007 |
| INVENTOR(S) | : Sagheer Ahmad et al. |

Page 1 of 1

It is certified that error appears in the above-identified patent and that said Letters Patent is hereby corrected as shown below:

At column 17, line 48, "predictionhe "lock" " should read --prediction and the "lock"--

Signed and Sealed this

Twenty-seventh Day of March, 2007

JON W. DUDAS
*Director of the United States Patent and Trademark Office*